(12) United States Patent
Shibata

(10) Patent No.: US 7,463,379 B2
(45) Date of Patent: Dec. 9, 2008

(54) COMMUNICATION APPARATUS AND FACSIMILE MACHINE

(75) Inventor: Satoshi Shibata, Aichi (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 1053 days.

(21) Appl. No.: 10/810,705

(22) Filed: Mar. 29, 2004

(65) Prior Publication Data
US 2004/0190075 A1 Sep. 30, 2004

(30) Foreign Application Priority Data
Mar. 28, 2003 (JP) ............... 2003-092172

(51) Int. Cl.
*H04N 1/00* (2006.01)
*H04M 3/00* (2006.01)
*G06K 15/00* (2006.01)

(52) U.S. Cl. .............. 358/1.15; 358/400; 358/3.07; 379/100.01

(58) Field of Classification Search ........... 358/400, 358/401, 1.15, 1.16, 509, 475; 379/100.04, 379/100.01, 100.02, 102.02, 102.03
See application file for complete search history.

(56) References Cited

U.S. PATENT DOCUMENTS

| | | | | |
|---|---|---|---|---|
| 6,826,631 B2 * | 11/2004 | Webb | ............ | 710/6 |
| 6,850,776 B1 * | 2/2005 | Sandelius et al. | ............ | 455/557 |
| 7,302,184 B2 * | 11/2007 | Ichii et al. | ............ | 398/111 |
| 7,307,541 B2 * | 12/2007 | Ikeda et al. | ............ | 340/815.4 |
| 2002/0002056 A1 * | 1/2002 | Kobayashi | ............ | 455/517 |
| 2004/0029610 A1 * | 2/2004 | Ihira et al. | ............ | 455/550.1 |
| 2004/0204125 A1 * | 10/2004 | Messel et al. | ............ | 455/566 |
| 2004/0224670 A1 * | 11/2004 | Hull et al. | ............ | 455/412.1 |
| 2005/0184859 A1 * | 8/2005 | Li | ............ | 340/435 |

FOREIGN PATENT DOCUMENTS

| | | |
|---|---|---|
| JP | A 3-227164 | 10/1991 |
| JP | A 6-70053 | 3/1994 |
| JP | A 7-154525 | 6/1995 |
| JP | A 11-41398 | 2/1999 |
| JP | A 2001-237922 | 8/2001 |
| JP | A 2002-335196 | 11/2002 |
| JP | A 4-314253 | 11/2005 |

* cited by examiner

*Primary Examiner*—Jerome Grant, II
(74) *Attorney, Agent, or Firm*—Oliff & Berridge, PLC

(57) ABSTRACT

A communication apparatus includes: a communication unit that communicates with other communication apparatus via a communication network; a detector that detects a communication status of the communication unit during a period of time at least from a time when a call is issued to the other communication apparatus by the communication apparatus until a time when a response from the other communication apparatus to the call is received by the communication apparatus; a light emitting device configured to emit light in a plurality of light emitting states that are visually discernible; and a controller that controls the light emitting state of the light emitting device in accordance with the communication status detected by the detector.

29 Claims, 19 Drawing Sheets

| RESOLUTION OF FACSIMILE DATA | BACKLIGHT COLOR |
|---|---|
| NORMAL | RED |
| FINE | GREEN |
| SUPER FINE | BLUE |

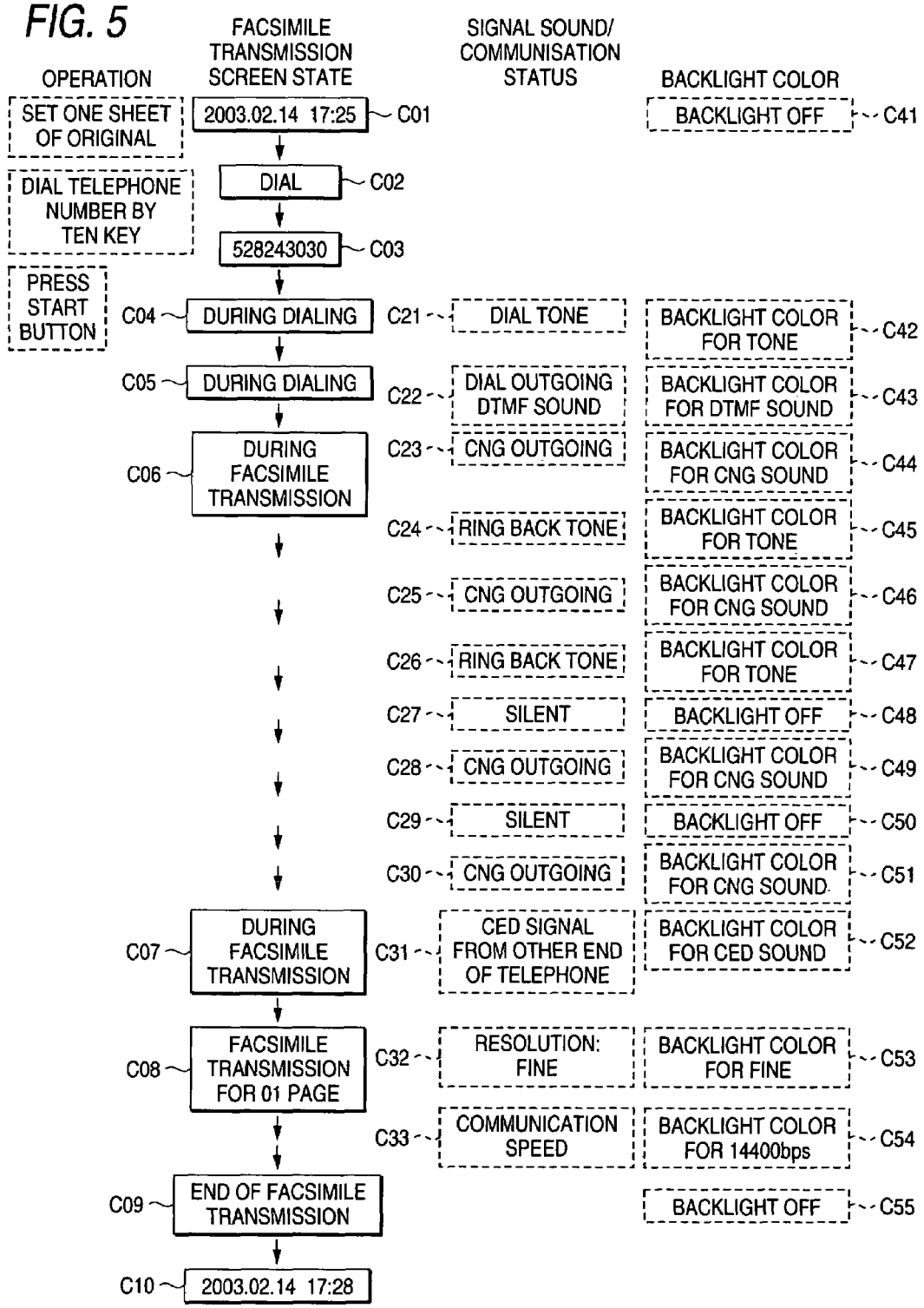

FIG. 6A

| DETECTION SIGNAL SOUND | BACKLIGHT COLOR |
|---|---|
| EXCHANGER TONE (DIAL TONE) | RED |
| EXCHANGER TONE (RING BACK TONE) | RED |
| EXCHANGER TONE (BUSY TONE) | RED |
| FACSIMILE CNG | BLUE |
| FACSIMILE CED | WHITE |
| DTMF DIAL 1 | RED |
| DTMF DIAL 2 | LIGHT BLUE |
| DTMF DIAL 3 | DARK BLUE |
| DTMF DIAL 4 | YELLOW |
| DTMF DIAL 5 | PURPLE |
| DTMF DIAL 6 | BROWN |
| DTMF DIAL 7 | GREEN |
| DTMF DIAL 8 | ORANGE |
| DTMF DIAL 9 | YELLOW GREEN |
| DTMF DIAL 0 | PINK |
| DTMF DIAL * | BLUE |
| DTMF DIAL # | WHITE |

FIG. 6B

| RESOLUTION OF FACSIMILE DATA | BACKLIGHT COLOR |
|---|---|
| NORMAL | RED |
| FINE | GREEN |
| SUPER FINE | BLUE |

FIG. 6C

| FACSIMILE COMMUNICATION SPEED | BACKLIGHT COLOR |
|---|---|
| 2400bps | RED |
| 4800bps | PURPLE |
| 7200bps | YELLOW |
| 9600bps | LIGHT BLUE |
| 12000bps | BLUE |
| 14400bps | WHITE |

FIG. 6D

| LINE SIGNAL VOLUME | BACKLIGHT BRIGHTNESS |
|---|---|
| NO OR SMALL SOUND | OFF |
| SLIGHTLY SMALL SOUND | 20% |
| ORDINARY SOUND | 40% |
| SLIGHTLY LARGE SOUND | 60% |
| LARGE SOUND | 80% |
| VERY LARGE SOUND | 100% |

FIG. 7A

| TYPE OF SOUND SOURCE | FREQUENCY | FREQUENCY RANGE FOR DETECTION | BACKLIGHT COLOR | PERIOD |
|---|---|---|---|---|
| EXCHANGER TONE (DIAL TONE) | 400Hz | 380Hz-420Hz | RED | CONTINUOUS |
| EXCHANGER TONE (RING BACK TONE) | 400Hz | 380Hz-420Hz | RED | ON FOR 1 SEC., OFF FOR 2 SEC. |
| EXCHANGER TONE (BUSY TONE) | 400Hz | 380Hz-420Hz | RED | ON FOR 0.5 SEC., OFF FOR 0.5 SEC. |
| FACSIMILE CNG SIGNAL | 1100Hz | 1080Hz-1120Hz | BLUE | |
| FACSIMILE CED SIGNAL | 2100Hz | 2080Hz-2120Hz | WHITE | |
| DTMF LOW GROUP 1 | 697Hz | 677Hz-717Hz | COMBINATION WITH HIGH GROUP (SEE FIG. 7B) | |
| DTMF LOW GROUP 2 | 770Hz | 750Hz-790Hz | COMBINATION WITH HIGH GROUP (SEE FIG. 7B) | |
| DTMF LOW GROUP 3 | 852Hz | 832Hz-872Hz | COMBINATION WITH HIGH GROUP (SEE FIG. 7B) | |
| DTMF LOW GROUP 4 | 941Hz | 921Hz-961Hz | COMBINATION WITH HIGH GROUP (SEE FIG. 7B) | |
| DTMF HIGH GROUP 1 | 1209Hz | 1189Hz-1229Hz | COMBINATION WITH LOW GROUP (SEE FIG. 7B) | |
| DTMF HIGH GROUP 2 | 1336Hz | 1316Hz-1356Hz | COMBINATION WITH LOW GROUP (SEE FIG. 7B) | |
| DTMF HIGH GROUP 3 | 1477Hz | 1457Hz-1497Hz | COMBINATION WITH LOW GROUP (SEE FIG. 7B) | |
| DTMF HIGH GROUP 4 | 1633Hz | 1613Hz-1653Hz | COMBINATION WITH LOW GROUP (SEE FIG. 7B) | |

FIG. 7B

| HIGH GROUP FREQUENCY / LOW GROUP FREQUENCY | DTMF HIGH GROUP 1 1209Hz | DTMF HIGH GROUP 2 1336Hz | DTMF HIGH GROUP 3 1477Hz | DTMF HIGH GROUP 4 1633Hz |
|---|---|---|---|---|
| DTMF LOW GROUP 1 697Hz | RED (1) | LIGHT BLUE (2) | DARK BLUE (3) | OFF (A) |
| DTMF LOW GROUP 2 770Hz | YELLOW (4) | PURPLE (5) | BROWN (6) | OFF (B) |
| DTMF LOW GROUP 3 852Hz | GREEN (7) | ORANGE (8) | YELLOW GREEN (9) | OFF (C) |
| DTMF LOW GROUP 4 941Hz | BLUE (*) | PINK (0) | WHITE (#) | OFF (D) |

FIG. 18A

| TYPE OF SIGNAL SOUND | FREQUENCY | FREQUENCY RANGE FOR DETECTION | BACKLIGHT BRIGHTNESS | PERIOD |
|---|---|---|---|---|
| EXCHANGER TONE (DIAL TONE) | 400Hz | 380Hz-420Hz | 100% | CONTINUOUS |
| EXCHANGER TONE (RING BACK TONE) | 400Hz | 380Hz-420Hz | 100% | ON FOR 1 SEC., OFF FOR 2 SEC. |
| EXCHANGER TONE (BUSY TONE) | 400Hz | 380Hz-420Hz | 100% | ON FOR 0.5 SEC., OFF FOR 0.5 SEC. |
| DTMF LOW GROUP 1 | 697Hz | 677Hz-717Hz | 40% | |
| DTMF LOW GROUP 2 | 770Hz | 650Hz-490Hz | 40% | |
| DTMF LOW GROUP 3 | 852Hz | 832Hz-872Hz | 40% | |
| DTMF LOW GROUP 4 | 941Hz | 921Hz-961Hz | 40% | |
| FACSIMILE CNG SIGNAL | 1100Hz | 1080Hz-1120Hz | 100% | |
| DTMF HIGH GROUP 1 | 1209Hz | 1189Hz-1229Hz | 20% | |
| DTMF HIGH GROUP 2 | 1336Hz | 1316Hz-1356Hz | 20% | |
| DTMF HIGH GROUP 3 | 1477Hz | 1457Hz-1497Hz | 20% | |
| DTMF HIGH GROUP 4 | 1633Hz | 1613Hz-1653Hz | 20% | |
| FACSIMILE CED SIGNAL | 2100Hz | 2080Hz-2120Hz | 80% | |

FIG. 18B

| LINE SIGNAL VOLUME | BACKLIGHT COLOR |
|---|---|
| NO OR SMALL SOUND | OFF |
| SLIGHTLY SMALL SOUND | RED |
| ORDINARY SOUND | YELLOW |
| SLIGHTLY LARGE SOUND | GREEN |
| LARGE SOUND | BLUE |
| VERY LARGE SOUND | WHITE |

COMMUNICATION APPARATUS AND FACSIMILE MACHINE

BACKGROUND OF THE INVENTION

1. Field of the Invention

The present invention relates to a communication apparatus such as a facsimile machine having a display device such as a liquid crystal display.

2. Description of the Related Art

In an apparatus having a telephone function such as a telephone or a facsimile machine, the user often cannot hear an incoming call sound when there is a call incoming in the noisy surroundings. In such cases, a technique for changing the image color displayed on the display portion corresponding to the type of incoming call sound is provided to allow the user to recognize the call incoming in the noisy surroundings (e.g., see JP-A-2001-237922 (specifically, on page 3)).

SUMMARY OF THE INVENTION

However, a status of facsimile transmission is generally displayed in character or by image when transmitting the facsimile data. The user who transmits the facsimile data must stay with the side of the facsimile machine all during the facsimile transmission and grasp the transmission status, resulting in a problem that the user cannot be engaged in other operations.

The invention has been achieved to solve the above-mentioned problem, and one of objects of the invention is to provide a communication apparatus and a facsimile machine in which the user can grasp the transmission status even if the user does not stay with the side of the apparatus during the data transmission.

In order to achieve the above object, according to a first aspect of the invention, there is provided a communication apparatus including: a communication unit that communicates with other communication apparatus via a communication network; a detector that detects a communication status of the communication unit during a period of time at least from a time when a call is issued to the other communication apparatus by the communication apparatus until a time when a response to the call from the other communication apparatus is received by the communication apparatus; a light emitting device configured to emit light in a plurality of light emitting states that are visually discernible; and a controller that controls the light emitting state of the light emitting device in accordance with the communication status detected by the detector.

According to a second aspect of the invention, there is provided a facsimile machine including: a communication unit that communicates a facsimile data with other facsimile machine via a public switched telephone network; a detector that detects a signal sound input to the communication unit and determines a type of the signal sound during a period of time at least from a time when a call is issued to the other facsimile machine by the facsimile machine until a time when a response to the call from the other facsimile machine is received by the facsimile machine; a light emitting device configured to emit light in a plurality of light emitting states that are visually discernible; and a controller that controls the light emitting state of the light emitting device in accordance with the type of the signal sound determined by the detector.

BRIEF DESCRIPTION OF THE DRAWINGS

A preferred embodiment of the present invention will be described in detail with reference to the following accompanying drawings, in which:

FIG. 5 is a schematic explanatory diagram showing a backlight emitting process in a backlight portion according to the embodiment;

FIGS. 6A through 6D are diagrams for explaining the correspondence between "signal sound/communication status" and backlight coloring according to the embodiment;

FIGS. 7A and 7B are diagrams for explaining the correspondence between signal sound and detection frequency according to the embodiment;

FIGS. 18A and 18B is a diagram for explaining the correspondence between signal sound and backlight coloring according to another embodiment of the invention.

DETAILED DESCRIPTION OF THE PREFERRED EMBODIMENTS

Referring now to the accompanying drawings, a description will be given in detail of a facsimile machine as shown as a preferred embodiment according to the invention.

Figure 1:
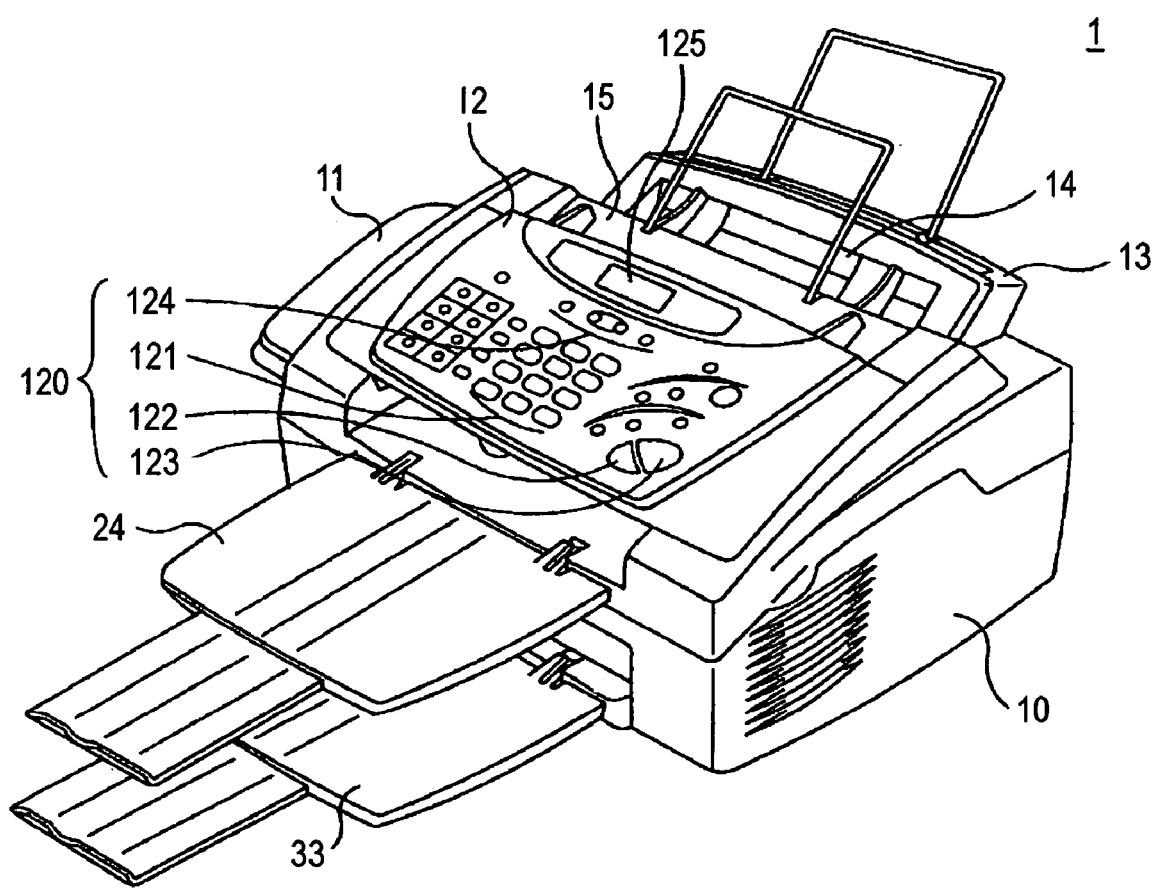
FIG. 1 is a schematic perspective view showing an appearance of a facsimile machine according to an embodiment of the invention.
Figure 2:
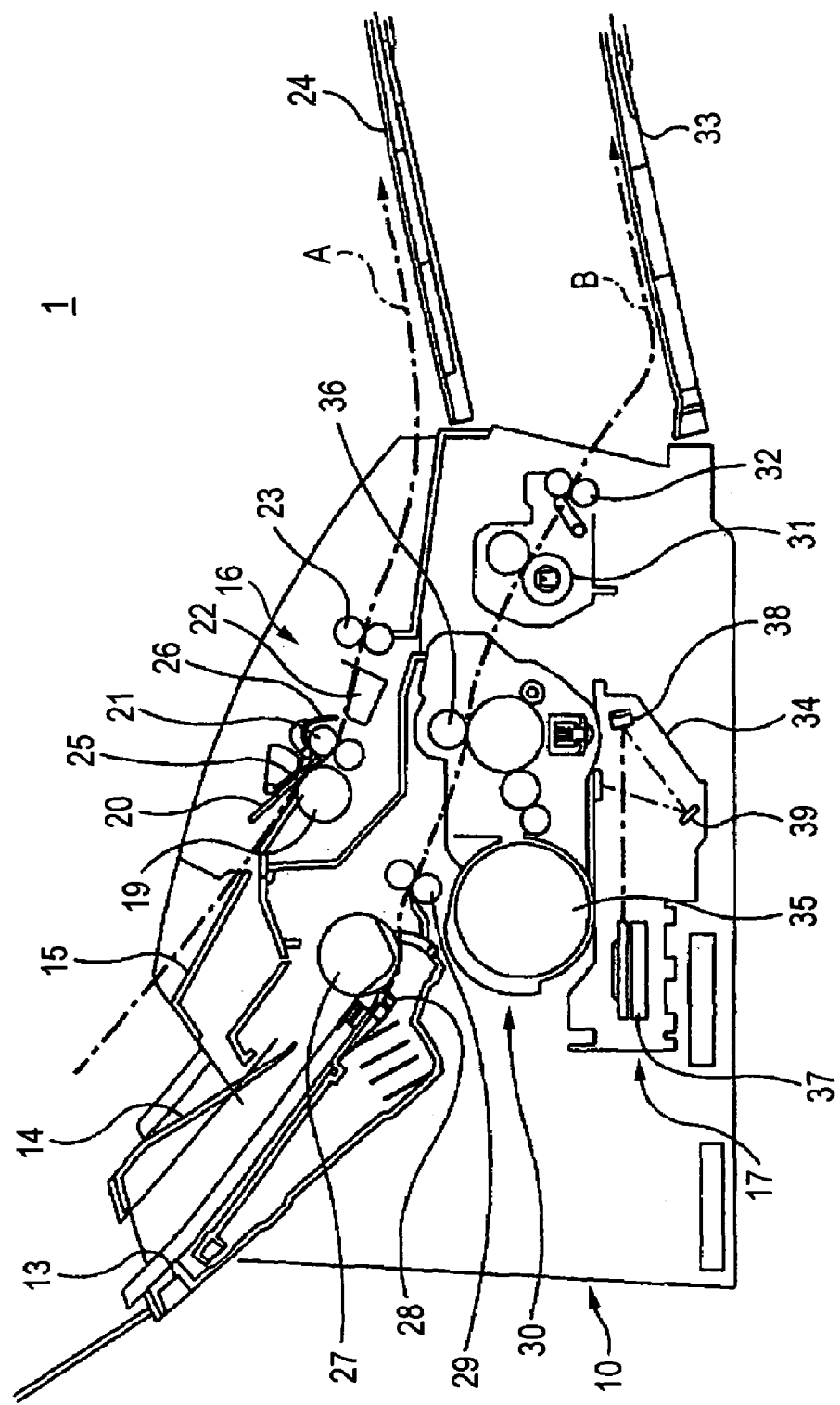
FIG. 2 is an explanatory view showing an internal constitution of the facsimile machine according to the embodiment.

FIG. 1 is a schematic perspective view showing an appearance of the facsimile machine, and FIG. 2 is an explanatory view showing an internal structure of the facsimile machine 1.

The facsimile machine 1 includes a handset (H/S) 11 mounted in a side part of a main body case 10, and an operation panel 12 provided in a front part on an upper face, as shown in FIG. 1. The operation panel 12 has various types of operation keys 120, including the numeric keys 121 for entering a telephone number (FAX number) of the other party, a start key 122, a stop key 123 and a selection key 124, and a liquid crystal display (LCD) 125 for displaying the information associated with various functions.

A first paper feed tray 13 for storing the recording sheets to be supplied into the apparatus is provided at an upper rear part of the main body, and a second paper feed tray 14 for laying the recording sheet that the user supplies by manual insertion is provided over the first paper feed tray 13. Moreover, an original paper feed tray 15 for laying the manuscript paper for reading is provided over the second paper feed tray 14.

The facsimile machine 1 also includes a scanner unit 16 for reading an image from the original, a recording unit 17 for forming the image on the recording sheet, and a board (not shown) for mounting a CPU 18 (see FIG. 3) controlling the driving of each portion, as shown in FIG. 2.

In the scanner unit 16, the original laid on the original paper feed tray 15 is detected by an original sensor (not shown), taken in one by one using a paper feed function with a paper feed roller 19 and a separation pad 20, and then conveyed to a reading unit 22 by the conveying rollers 21, as indicated by the arrow A in FIG. 2. The reading unit 22 reads the image formed on the original. The original, after the image is read by the reading unit 22, is exhausted into a first paper exhaust tray provided in front via the paper exhaust rollers 23.

The scanner unit 16 is provided with an original front sensor 25 for sensing the top of the original and an original rear sensor 26 for sensing the rear end of the original, in addition to the original sensor. The CPU controls each portion within the scanner unit 16, based on the sensed results from those sensors, to adjust the paper feed, and perform the operation of the scanner unit 16.

The recording unit 17 takes in the recording paper laid on a first paper feed tray 13 or a second paper feed tray 14 one by one by a paper feed mechanism consisting of a paper feed roller 27 and a separation pad 28, as indicated by the arrow B in FIG. 2. And the recording paper is fed via a conveying roller 29 to an image forming apparatus 30. In the image forming apparatus 30, an image is formed on the recording paper. The recording paper after passing through the image forming apparatus is fed to a fixing unit 31 on the downstream side. The fixing unit 31 fixes the image with toner on the recording paper. Furthermore, the recording paper after passing through the fixing unit is expelled via the paper exhaust roller 32 onto a second exhaust paper tray 33.

The image forming apparatus 40 operates a laser beam scanning unit 34 to apply a laser beam onto the photographic drum, and form an electrostatic latent image on the surface. The laser beam scanning unit 34 comprises a laser emitting portion 37 for emitting the laser beam based on the image data upon an instruction from the CPU 18, a laser beam reflecting lens 38, and a reflecting mirror 39 for reflecting the laser beam from the lens 38 toward the photographic drum. The image forming apparatus 30 comprises a toner tank 35 for reserving the toner, in which the toner supplied from the toner tank 35 is deposited on the photographic drum after forming the electrostatic latent image, and the toner deposited on the photographic drum is transferred onto the recording paper by applying electric charges onto the recording paper using a transfer roller 36. FIG. 2 is a constitutional view of the image forming apparatus 30, or a view for explaining the functions of the image forming apparatus 30. That is, the image forming apparatus 30 of the embodiment has a well known constitution as the image forming apparatus capable of forming the toner image.

Figure 3:
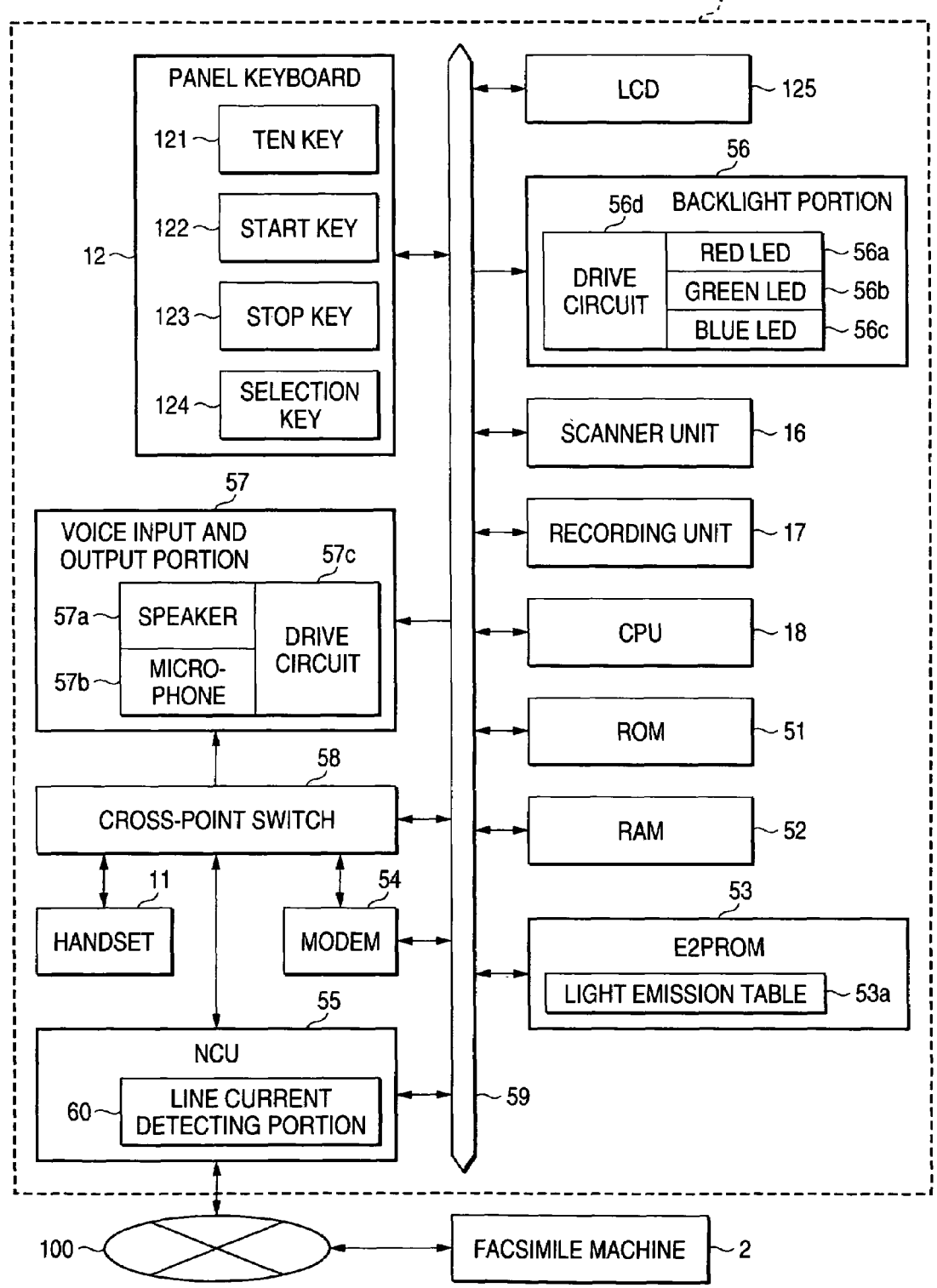
FIG. 3 is a block diagram showing an electrical configuration of the facsimile machine according to the embodiment.

Referring now to FIG. 3, an electrical configuration of the facsimile machine 1 will be described hereinbelow. FIG. 3 is a block diagram representing the electrical configuration of the facsimile machine 1 according to the embodiment of the invention.

The facsimile machine 1 has a function of implementing the speech service via a telephone line network 100 and a function of transmitting and receiving the image via the telephone line network 100.

The facsimile machine 1 includes the CPU 18, a ROM 51, a RAM 52, an E2PROM (Electrically Erasable Programmable ROM) 53, the scanner unit 16, the recording unit 17, a modem 54, a network controller (NCU) 55, an operation panel 12, an LCD 125, a backlight portion 56, a handset 11, a voice input and output portion 57, a cross point switch 58, and a bus 59 for connecting the above components, as shown in FIG. 3.

The CPU 18 controls the overall operation of the facsimile machine 1, in accordance with a processing procedure stored beforehand in the ROM 51, including storing the processing result in the RAM 52 and sending an instruction via the bus 59 to each component of the facsimile machine 1.

Within the ROM 51, a facsimile function program necessary to operate the facsimile machine and the like are stored. Within the ROM 51, a variety of programs and various types of data required to execute those programs are stored beforehand.

The RAM 52 has a work memory area necessary for making various controls, a memory area storing the facsimile data to be transmitted or received, a dial buffer area storing the dial data representing the telephone number of originator, and an area storing various flags.

The E2PROM 53 is a non-volatile memory capable of holding data even in a state where electric power is not supplied. The E2PROM 53 stores therein an emission table 53a for use in setting up a light emitting state of the backlight portion 56, and a storage area for storing various types of setting data that the user can arbitrary change.

The scanner unit 16 scans an image on the paper set at a predetermined scan position (not shown) to produce the image data from the image, upon an instruction from the CPU 18.

The recording unit 17 records (prints) the image on the paper set at a predetermined paper feed position (not shown), upon an instruction from the CPU 18.

The modem 54 modulates the image data produced by the scanner unit 16 to generate an image signal that can be transmitted over the telephone line network 100, and demodulates an image signal input via the NCU 55 over the telephone line network 100 to produce the image data or detect the frequency of an input signal sound, upon receiving an instruction from the CPU 18.

The NCU 55 sends a dial signal to a public switched telephone network (PSTN) 100, or responds to a call signal over the public switched telephone network 100, for example, to connect communicably itself to the external facsimile machine 2 via the public switched telephone network 100. A line current detecting portion 60 for detecting a magnitude of current for the signal input into or output from the NCU 55 is attached to the NCU 55.

The operation panel 12 includes the numeric keys 121, a start key 122, a stop key 123, and a selection key 124, and inputs an instruction signal for making various types of processing operation into the apparatus (CPU 18) in accordance with an operation of the user. When a command for starting to print the emission table 53b is entered by the operation key 124, the CPU 18 outputs an emission table print instruction. When a command for starting or completing the setting or changing of the emission table 53b, an emission table setting start or completion instruction is output to the CPU 18.

The LCD 124 is provided as display device for displaying various types of information such as a message or an error message for guiding an operation procedure for the user.

The backlight portion 56 includes a red LED 56a, a green LED 56b and a blue LED 56c as the light sources, and a drive circuit 56d for driving the light sources, and illuminates the LCD 125 from the back face. And various colors are represented by an emission combination of the color LEDs.

The handset 11 is a transmitter and receiver used by being detached from the main body of the facsimile machine 1.

The voice input and output portion 57 includes a speaker 57a, a microphone 57b and a drive circuit 57c for driving the speaker 57a and the microphone 57b, and is employed to make the so-called hands-free service using the speaker 57a and the microphone 57b as the transmitter and receiver, in addition to outputting the voice based on a voice signal from the speaker 57a.

The cross point switch 58 is a switch for changing over the analog signal channel to the modem 54, NCU 55, handset 11 or the voice input and output portion 57 under the control of the CPU 18. When an operation for detaching the handset 11 from the main body of the facsimile machine 1 (off-hook operation) is performed, the path from the NCU 55 to the handset 11 is set up as the channel, whereby the voice signal is ready for transmission on this channel. The channel set up in this way is released when an operation for restoring the handset 11 to the facsimile machine 1 (on-hook operation) is performed, whereby the voice signal is not sent on this channel.

When an operation for depressing the start key 122 on the operation panel 12 to transmit the image (FAX transmission) is made, or an image signal is received, the path from the NCU 55 to the modem 54 is set up as the channel, whereby the voice signal is ready for transmission. The set up channel is released when the output of image signal by the modem 54 is terminated or the input of image signal from the telephone line network 100 is terminated, whereby the image signal is not sent on this channel.

When an operation for starting the hands-free service on the operation panel 12 is performed, the path from the NCU 55 to the voice input and output portion 57 is set up as the channel.

Figure 4:
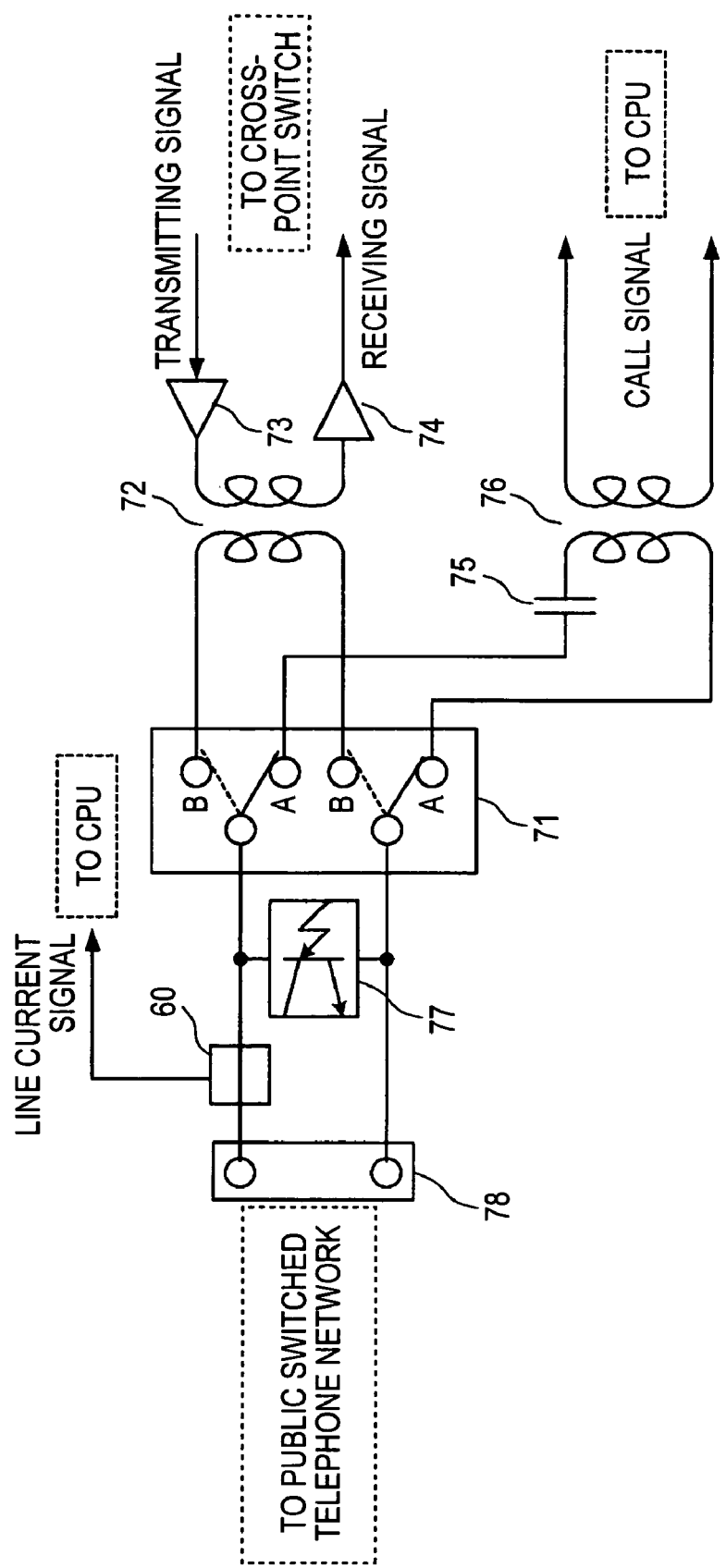
FIG. 4 is a circuit diagram representing an internal configuration of an NCU according to the embodiment.

Referring now to FIG. 4, the configuration of the NCU 55 and the line current detecting portion 60 will be described hereinbelow. FIG. 4 is a circuit diagram showing the configuration of the NCU 55.

The NCU 55 includes a relay 71 for changing over the telephone line, the transformers 72 and 76 for taking in a signal from the telephone line, the amplifiers 73 and 74 for amplifying the signal, a condenser 75 for extracting the signal, a dial pulse sending circuit 77 for sending a dial pulse, and a modular connector 78 for connecting to the telephone line, as shown in FIG. 4.

The relay 71 is usually at position A as indicated by the solid line in FIG. 4, in which a signal from the telephone line is sent to the CPU 18. On the other hand, when an off-hook operation of the handset 11 or an operation for FAX transmission is performed on the operation panel 12, the relay 71 is switched to position B as indicated by the dotted line in FIG. 4, in which a signal from the telephone line is sent to the cross point switch 58.

For example, when a call signal is entered via the modular connector 78 from the public switched telephone network 100, the relay 71 is at position A as indicated by the solid line in FIG. 4, so that the call signal is input into the CPU 18 to detect a call coming.

Thereafter, when an operation for detaching the handset 11 from the main body of the facsimile machine 1 (off-hook operation) is performed, the relay 71 is switched to position B as indicated by the dotted line in FIG. 4, a reception signal entered into the NCU 55 from the public switched telephone network 100 is sent to the cross point switch 58, and a transmission signal entered into the NCU 55 from the cross point switch 58 is transmitted to the public switched telephone network 100. As described above, when the off-hook operation of the handset 11 is performed, the path from the NCU 55 to the handset 55 is set up as the channel by the cross point switch 58, whereby the reception signal and the transmission signal are passed between the handset 11 and the public switched telephone network 100 to enable the communication.

The line current detecting portion 60 is attached on the path between the modular connector 78 and the relay 71 and detects a magnitude of current for the signal on this path, as shown in FIG. 4. The line current detecting portion 60 is connected to the CPU 18, whereby a signal indicating the magnitude of current is input into the CPU 18.

Referring now to FIG. 5, a processing for enabling the backlight portion 56 to be emissive will be described hereinbelow. FIG. 5 is an explanatory diagram showing the indication on the LCD 125 and the light emitting state of the backlight portion 56 in the FAX transmission.

At stand-by status, the LCD 125 displays the current time (C01), and the backlight portion 56 is OFF (C41). In a case where one original is set, the LCD 125 displays a message "dial" (C02). Then, when the line number of a transmission destination is dialed from the numeric keys 121, the input numbers are displayed on the LCD 125 (C03).

And after the dialing input, if the start key 122 is depressed, the relay 71 is switched to position B as indicated by the dotted line in FIG. 4, whereby a dial tone is entered from the public switched telephone network 100 (C21). At this time, the LCD 125 displays a message "dialing" (C04), and the backlight portion 56 is lighted with a color corresponding to the tone signal (C42).

And a DTMF (Dual Tone Multi Frequency) signal sound corresponding to the line number of transmission destination is sent out from the modem 54 to the public switched telephone network 100 (C22). Then, the LCD 125 continually displays the message "dialing" (C05), and the backlight portion 56 is lighted with a color corresponding to the DTMF signal sound (C43).

After the DTMF signal sound is sent, a CNG (Calling Tone) signal sound for calling the facsimile machine 2 of transmission destination is sent from the modem 54 to the telephone line (C23) Then, the LCD 125 displays a message "Fax transmitting . . ." (C06) If the CNG signal sound is sent, a ring back tone is entered from the telephone line, so that the CNG signal sound and the ring back tone are overlapped (C23 to C26). Then, the backlight portion is lighted alternately with a color corresponding to the CNG signal sound and a color corresponding to the tone signal at an interval of 0.2 sec. (C44 to C47).

If the CNG signal sound is continually sent and the facsimile machine 2 of transmission destination detects this CNG signal sound, the telephone line is in a silent state (C27). At this time, the backlight portion 56 is turned OFF (C48). If the silent state is detected, the modem 54 sends out the CNG signal sound to the telephone line twice with the silent state interposed (C28 to C30). Thereby, the backlight portion 56 is lighted with a color corresponding to the CNG signal sound (C49), then turned OFF (C50), and lighted again with a color corresponding to the CNG signal sound (C51).

If the facsimile machine 2 of transmission destination detects this CNG signal sound twice, the facsimile machine 2 determines that a fax is transmitted, and sends out a CED (Called identification) signal to reply to the facsimile machine 1. And if the CED signal is entered into the facsimile machine 1, the LCD 125 displays a message "Fax transmitting . . ." (C07), and the backlight portion 56 is lighted with a color corresponding to the CED signal sound (C52).

If the CED signal is entered, the facsimile machine 1 negotiates with the facsimile machine of transmission destination to decide the fax reading resolution (fine in FIG. 5). At this time, the LCD 125 displays a message "Fax transmitting . . . page 01" (C08), and the backlight portion 56 is lighted with a color corresponding to the resolution of fine (C53). Thereafter, the backlight portion is lighted with a color corresponding to the fax transmission rate during the fax transmission until the fax transmission is terminated (14400bps in FIG. 5) (C54).

And if the fax transmission is terminated, the LCD 125 displays a message "Fax transmission completed." (C09), and the backlight portion 56 is turned OFF (C55). Thereafter, the facsimile machine 1 returns to the standby state, and the LCD 125 displays the current time (C10).

The relationship between "signal sound/communication status" and "backlight color" in FIG. 5 is given by a correspondence table as shown in FIG. 6.

FIG. 6A is an example of a correspondence table between the detected signal sound and the backlight color. As shown in FIG. 6A, the backlight is red for an exchanger tone signal without regard to the type of dial tone, ring back tone or busy tone. Similarly, the backlight is blue for a fax CNG signal, and white for a fax CED signal. Also, the backlight is red for a DTMF signal corresponding to dial 1 and light blue for a DTMF signal corresponding to dial 2.

FIG. 6B is an example of a correspondence table between the fax data resolution and the backlight color. As shown in FIG. 6B, the backlight is green when the resolution is fine.

FIG. 6C is an example of a correspondence table between the fax communication speed and the backlight color. As shown in FIG. 6C, the backlight is white when the communication speed is 14400bps.

FIG. 6D is an example of a correspondence table between the line signal volume and the backlight brightness. As shown in FIG. 6D, the brightness is changed at an interval of 20% from 0% to 100% according to the line signal volume.

The emission table 53a consists of entries of the signal sound, the facsimile data resolution, and the facsimile communication speed with their corresponding colors, and the line signal volume with the brightness corresponding to line signal volume, as shown in FIGS. 6A through 6D.

In the embodiment, the type of detected signal sound is determined according to the frequency of signal sound, as shown in FIG. 7. As shown in FIG. 7A, the frequency for the exchanger tone signal is 400 Hz without regard to the type of dial tone, ring back tone or busy tone (different ON/OFF period as indicated in the column "period"), the signal sound in a frequency range from 380 Hz to 420 Hz (400±20 Hz) is determined as the exchanger tone signal. Similarly, the signal sound in a frequency range from 1080 Hz to 1120 Hz (1100±20 Hz) is determined as the fax CNG signal, and the signal sound in a frequency range from 2080 Hz to 2120 Hz (2100±20 Hz) as the fax CED signal.

The DTMF signal is a combination of signals at two frequencies in a voice frequency band, in which the frequency of DTMF signal belonging to the low group is 697 Hz, 770 Hz, 852 Hz or 941 Hz, and the frequency of DTMF signal belonging to the high group is 1209 Hz, 1366 Hz, 1477 Hz or 1633 Hz. The numbers 0 to 9, alphabets A to D and the symbols *, # can be represented by combining the signals.

For example, the signal sound in a frequency range from 832 to 872 Hz (852±20 Hz) is determined as the DTMF low group 3 signal, and the signal sound in a frequency range from 1316 to 1356 Hz (1336±20 Hz) as the DTMF high group 2 signal.

And when the DTMF low group 3 signal and the DTMF high group 2 signal are combined, the backlight portion is lighted in orange color as shown in FIG. 7B. FIG. 7B is a correspondence table representing the combination of the DTMF signal low group and the DTMF signal high group and the backlight color. In the table, the character within parentheses indicates the number, alphabet or symbol that is represented by the combination of low group and high group as described above.

Figure 8:
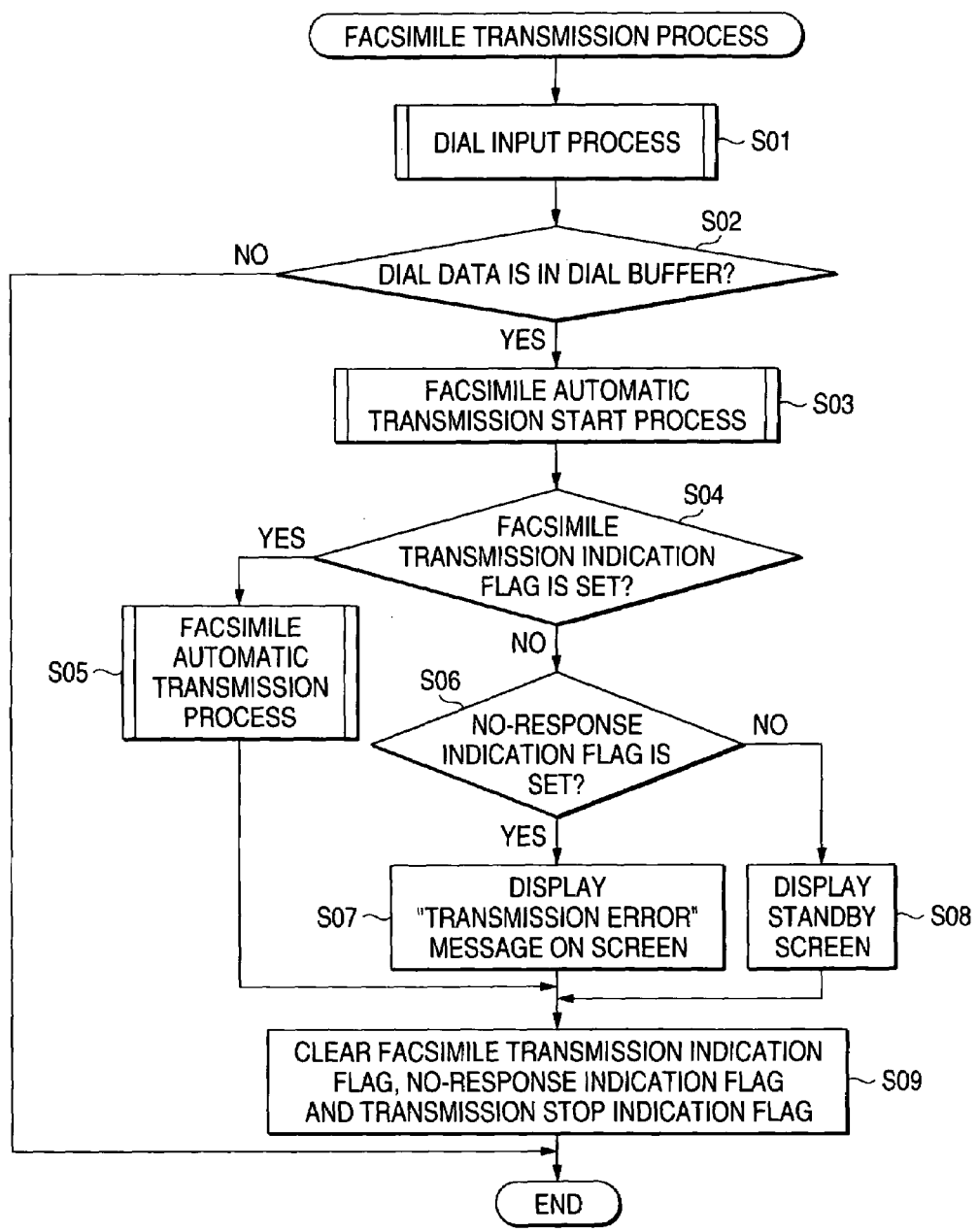
FIG. 8 is a flowchart showing a facsimile transmission processing procedure according to the embodiment.

Referring now to FIG. 8, a facsimile transmission process executed by the CPU 18 will be described hereinbelow. FIG. 8 is a flowchart showing the facsimile transmission process. The facsimile transmission process is executed repeatedly while the facsimile machine 1 is operated (power ON).

When the facsimile transmission process is executed, the CPU 18 performs, first of all, the dial input processing at S01.

Figure 9:
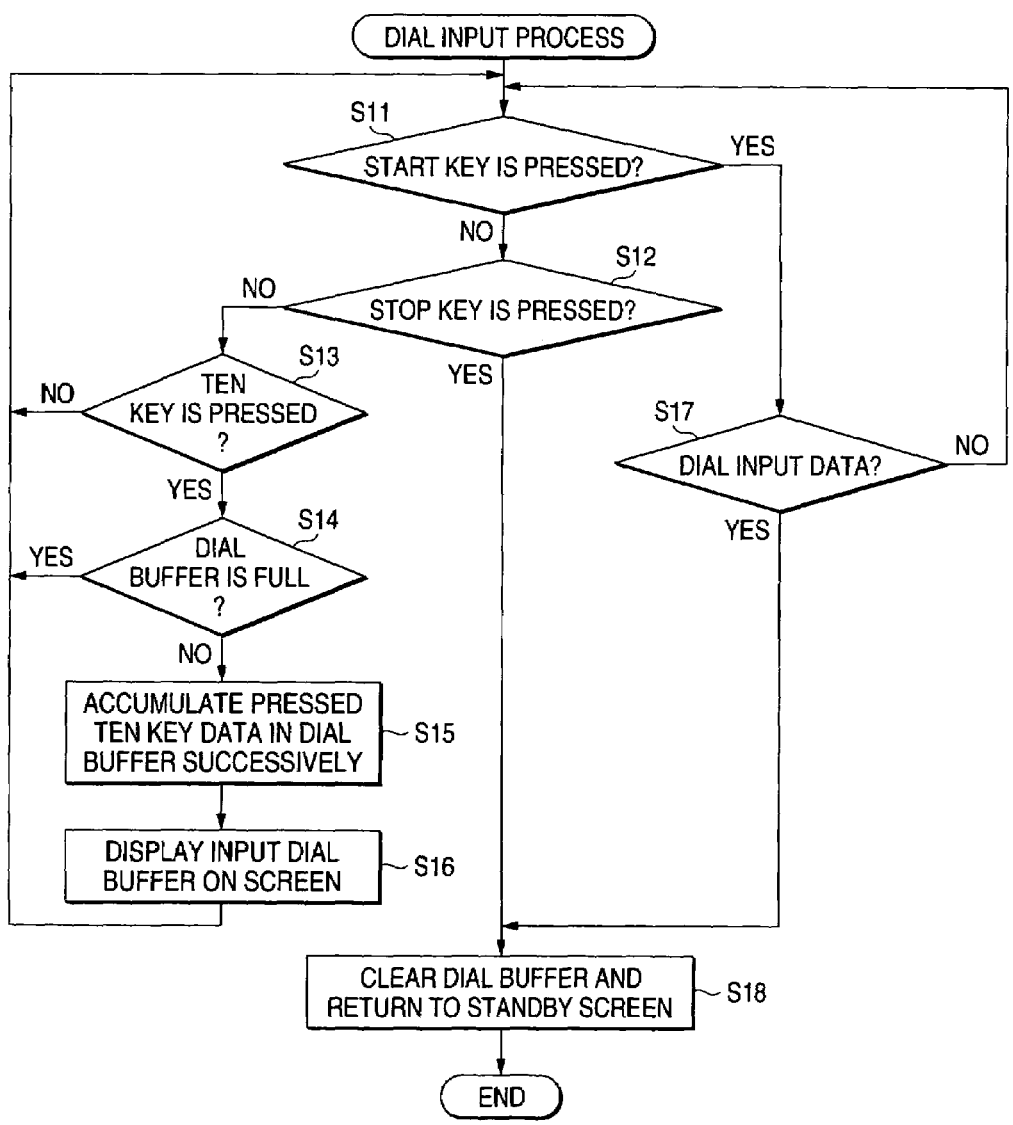
FIG. 9 is a flowchart showing a dial input processing procedure according to the embodiment.

The dial input processing is performed in accordance with a procedure as shown in FIG. 9. That is, in the dial input processing, the CPU 18 first of all determines whether or not the start key 122 is depressed at S11. If it is determined that the start key 122 is depressed (S11: YES), it is determined whether or not the dial data exists in a dial buffer provided within the RAM 52 at S17. Herein, if the dial data does not exist in the dial buffer (S17: NO), the step S11 is repeated. Also, if it is determined at S17 that the dial data exists in the dial buffer (S17: YES), the dial input processing is terminated.

On the other hand, if it is determined at S11 that the start key 122 is not depressed, the procedure proceeds to S12, where it is determined whether or not the stop key 123 is depressed. Herein, if it is determined that the stop key 123 is depressed (S12: YES), the procedure proceeds to S18, the dial buffer is cleared, and a standby screen is displayed on the LCD 125 (see C01 and C10 in FIG. 5). Then, the dial input processing is terminated.

If it is determined at S12 that the stop key 123 is not depressed (S12: NO), the procedure proceeds to S13, where it is determined whether or not the ten key 121 is depressed. Herein, if it is determined that the ten key 121 is not depressed (S13: NO), the procedure proceeds to S15.

At S15, the dial data corresponding to the number of the depressed ten key 121 is stored successively in the dial buffer. After the stored dial data is displayed on the LCD 125 at S16 (see C03 in FIG. 5), the procedure proceeds to S11 to repeat the above steps.

Returning to FIG. 8, if the processing of S01 is terminated, the procedure proceeds to S02, where it is determined whether or not the dial data exists in the dial buffer. Herein, if it is determined that the dial data does not exist in the dial buffer (S02: NO), the facsimile transmission process is terminated. On the other hand, if it is determined that the dial data exists in the dial buffer at S02 (S02: YES), the procedure proceeds to S03, where the facsimile automatic transmission start process is performed.

Figure 10:
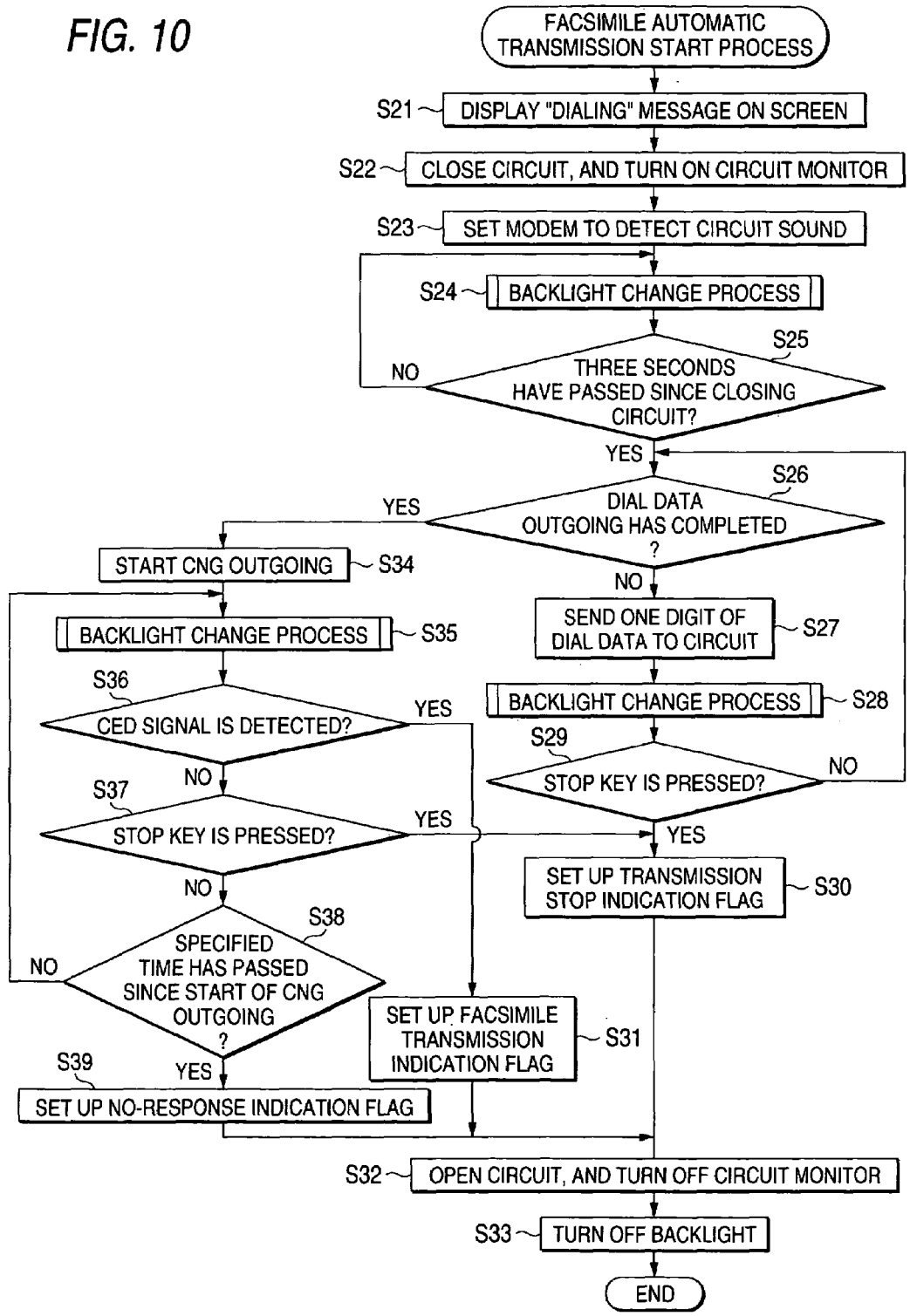
FIG. 10 is a flowchart showing a facsimile automatic transmission start processing procedure according to the embodiment.

The facsimile automatic transmission start process is performed in accordance with a procedure as shown in FIG. 10. That is, in the facsimile automatic transmission start process, the CPU 18 first of. all displays a message "dialing . . ." on the LCD 125 at S21 (see C04 in FIG. 5). And the procedure proceeds to S22 to close the line (switch the relay 71 to position B as indicated by the dotted line in FIG. 4), and turn ON the monitor of the line. Turning ON the monitor, the signal sound input via the public switched telephone network 100 is output from the speaker 57a. Moreover, an instruction for detecting the signal sound is sent to the modem 54 at S23.

Thereby, the modem 54 having received the instruction starts to detect the frequency of signal sound. Then, the procedure proceeds to S24.

At S24, a backlight change process, which will be described later, is performed. Then, the procedure proceeds to S25. And at S25, it is determined whether or not 3 seconds have passed since the line is closed. If it is determined that 3 seconds have not passed after the line is closed (S25: NO), the procedure proceeds to S24 to repeat the above process. On the other hand, if it is determined at S25 that 3 seconds have passed since the line is closed (S25: YES), the procedure proceeds to S26.

At S26, it is determined whether or not sending the dial data stored in the dial buffer is completed. If it is determined that sending the dial data is not completed (S26: NO), the procedure proceeds to S27, where one digit of the telephone number among the dial data stored in the dial buffer is sent out to the line. That is, the modem 54 outputs the DTMF low group signal and the DTMF high group signal corresponding to the one digit of the telephone number via the NCU 55 to the public switched telephone network 100. And the procedure proceeds to S28 to make the backlight change process. Then the procedure proceeds to S29.

At S29, it is determined whether or not the stop key 123 is depressed. If it is determined that the stop key 123 is not depressed (S29: NO), the procedure proceeds to S26 to repeat the above process. On the other hand, if it is determined at S29 that the stop key 123 is depressed (S29: YES), the procedure proceeds to S30, where a transmission stop indication flag provided in the RAM 52 is set.

And the procedure proceeds to S32, where the line is opened (the relay 71 is switched to position A as indicated by the solid line in FIG. 4), and the line monitor is turned OFF. That is, the signal sound input from the public switched telephone network 100 is not output from the speaker 57a.

Moreover, at S33, the backlight portion 56 is turned OFA, and the facsimile automatic transmission start process is terminated.

On the other hand, if it is determined at S26 that sending the data stored in the dial buffer is completed (S26: YES), the procedure proceeds to S34 to start to send the CNG signal. And the procedure proceeds to S35, where the backlight change process is performed.

Thereafter, at S36, it is determined whether or not the CED signal is detected. Herein, if it is determined that the CED signal is detected (S36: YES), the procedure proceeds to S31, where the facsimile transmission indication flag provided in the RAM 52 is set. Thereafter, the steps S32 and S33 are performed. Then, the facsimile automatic transmission start process is terminated.

On the other hand, if it is determined at S36 that the CED signal is not detected (S36: NO), the procedure proceeds to S37 to determine whether or not the stop key 123 is depressed. And if it is determined that the stop key 123 is depressed (S37: YES), the procedure proceeds to S30. Then, the steps S30, S32 and S33 are performed. Then, the facsimile automatic transmission start process is performed.

Also, if it is determined at S37 that the stop key 123 is not depressed (S37: NO), the procedure proceeds to S38, where it is determined whether or not a predefined period of time has passed after starting to send the CNG signal. Herein, if it is determined that the predefined period of time has not passed, the procedure proceeds to S35 to repeat the above process. On the other hand, if it is determined that the predefined period of time has passed (S38: YES), the procedure proceeds to S39, where a no-response indication flag provided in the RAM 52 is set. Then, the procedure proceeds to step S32. Thereby, the steps S32 and S33 are performed. Then, the facsimile automatic transmission start process is terminated.

Figure 11:
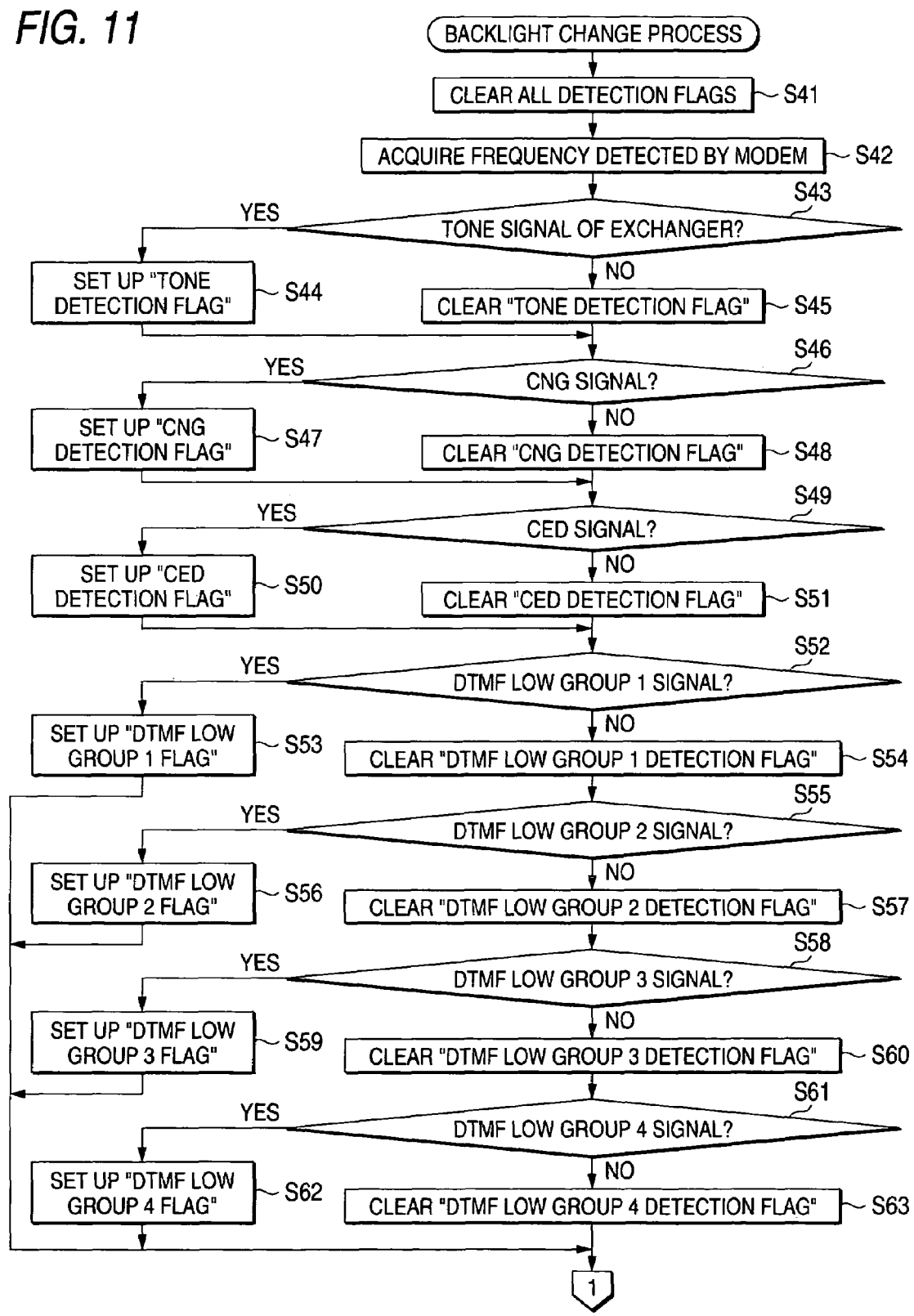
FIG. 11 is a flowchart showing the first half of a backlight change processing procedure according to the embodiment.
Figure 12:
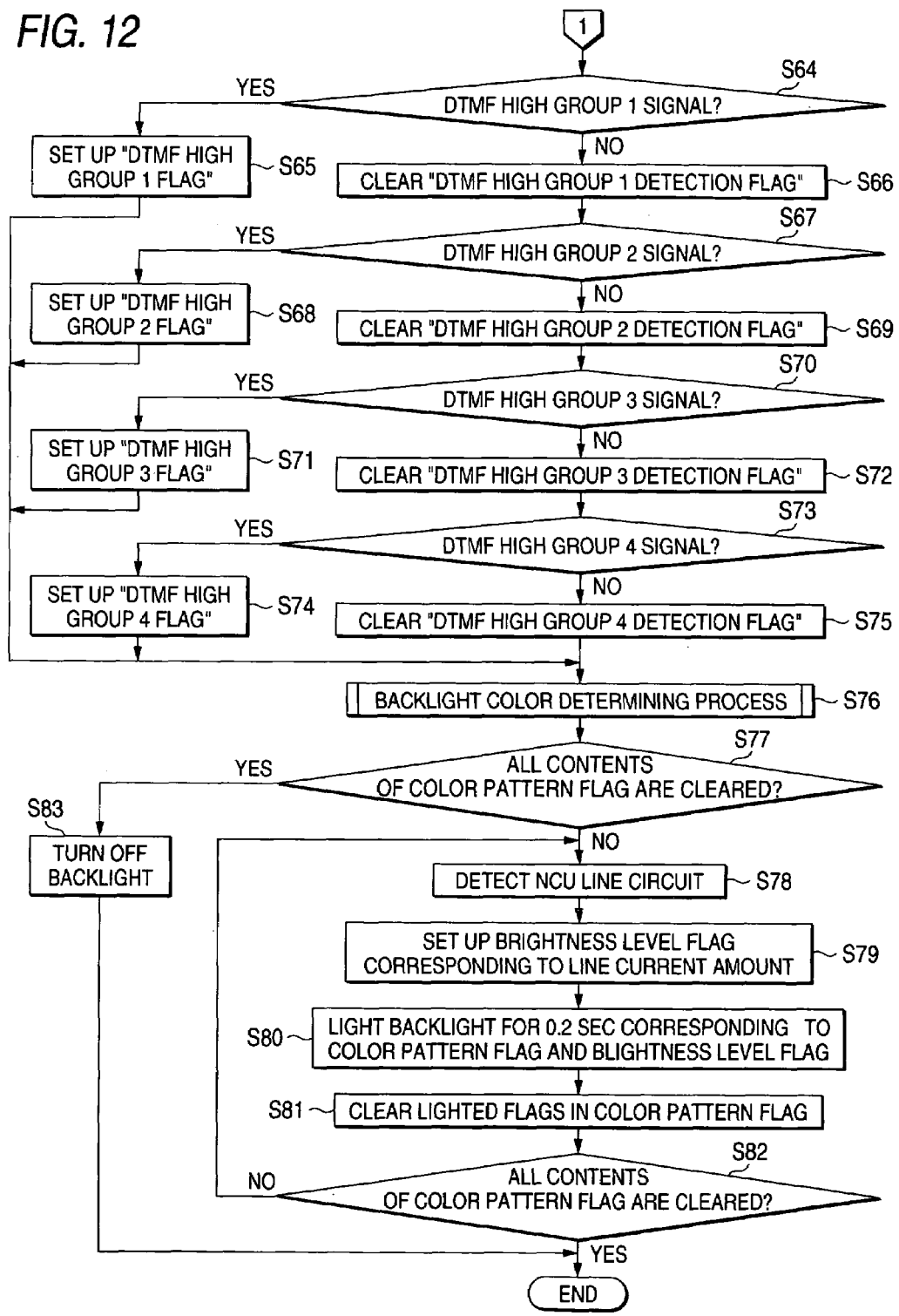
FIG. 12 is a flowchart showing the latter half of the backlight change processing procedure according to the embodiment.

Referring now to FIGS. 11 and 12, the backlight change process at steps S24, S28 and S35 will be described hereinbelow. FIG. 11 is a flowchart showing the former half of the backlight change process, and FIG. 12 is a flowchart showing the latter half of the backlight change process.

When the backlight change process is executed, the CPU 18 first of all clears all the signal detection flags provided in the RAM 52 at step S41. The signal detection flags indicate the type of signal sound detected, and include a tone signal detection flag, a CNG signal detection flag, a CED signal detection flag, the DTMF low group 1 to 4 signal detection flags, and the DTMF high group 1 to 4 signal detection flags.

And the procedure proceeds to step S42 to acquire the frequency of signal sound detected by the modem 54.

Thereafter, at S43, it is determined whether or not the acquired frequency falls within a detection frequency range of exchanger tone signal (see FIG. 7A for the detection frequency of signal sound). If it is determined that it falls within the detection frequency range of exchanger tone signal (S43: YES), the procedure proceeds to S44, where the tone signal detection flag provided in the RAM 52 is set. Then, the procedure proceeds to S46. On the other hand, if it is determined that it does not fall within the detection frequency range of exchanger tone signal (S43: NO), the procedure proceeds to S45, where the tone signal detection flag is cleared. Then, the procedure proceeds to S46.

At S4.6, it is determined whether or not the acquired frequency falls within the detection frequency range of CNG signal. If it is determined that it falls within the detected frequency range of CNG signal (S46: YES), the procedure proceeds to S47, where the CNG signal detection flag provided in the RAM 52 is set. Then, the procedure proceeds to S49. On the other hand, if it is determined that it does not fall within the detection frequency range of CNG signal (S46: NO), the procedure proceeds to S48, where the CNG signal detection flag is cleared. Then, the procedure proceeds to S49.

At S49, it is determined whether or not the acquired frequency falls within the detection frequency range of CED signal. If it is determined that it falls within the detected frequency range of CED signal (S49: YES), the procedure proceeds to S50, where the CED signal detection flag provided in the RAM 52 is set. Then, the procedure proceeds to S52. On the other hand, if it is determined that it does not fall within the detection frequency range of CED signal (S49: NO), the procedure proceeds to S51, where the CED signal detection flag is cleared. Then, the procedure proceeds to S52.

At S52, it is determined whether or not the acquired frequency falls within the detection frequency range of DTMF low group 1 signal. If it is determined that it falls within the detected frequency range of DTMF low group 1 signal (S52: YES), the procedure proceeds to S53, where the DTMF low group 1 signal detection flag provided in the RAM 52 is set. Then, the procedure proceeds to S64. On the other hand, if it is determined that it does not fall within the detection frequency range of DTMF low group 1 signal (S52: NO), the procedure proceeds to S54, where the DTMF low group 1 signal detection flag is cleared. Then, the procedure proceeds to S55.

At S55, it is determined whether or not the acquired frequency falls within the detection frequency range of DTMF low group 2 signal. If it is determined that it falls within the detected frequency range of DTMF low group 2 signal (S55: YES), the procedure proceeds to S56, where the DTMF low group 2 signal detection flag provided in the RAM 52 is set. Then, the procedure proceeds to S64. On the other hand, if it is determined that it does not fall within the detection frequency range of DTMF low group 2 signal (S55: NO), the procedure proceeds to S57, where the DTMF low group 2 signal detection flag is cleared. Then, the procedure proceeds to S58.

At S58, it is determined whether or not the acquired frequency falls within the detection frequency range of DTMF low group 3 signal. If it is determined that it falls within the detected frequency range of DTMF low group 3 signal (S58: YES), the procedure proceeds to S59, where the DTMF low group 3 signal detection flag provided in the RAM 52 is set. Then, the procedure proceeds to S64. On the other hand, if it is determined that it does not fall within the detection frequency range of DTMF low group 3 signal (S58: NO), the procedure proceeds to S60, where the DTMF low group 3 signal detection flag is cleared. Then, the procedure proceeds to S61.

At S61, it is determined whether or not the acquired frequency falls within the detection frequency range of DTMF low group 4 signal. If it is determined that it falls within the detected frequency range of DTMF low group 4 signal (S61: YES), the procedure proceeds to S62, where the DTMF low group 4 signal detection flag provided in the RAM 52 is set. Then, the procedure proceeds to S64. On the other hand, if it is determined that it does not fall within the detection frequency range of DTMF low group 4 signal (S61: NO), the procedure proceeds to S63, where the DTMF low group 4 signal detection flag is cleared. Then, the procedure proceeds to S64.

At S64, it is determined whether or not the acquired frequency falls within the detection frequency range of DTMF high group 1 signal. If it is determined that it falls within the detected frequency range of DTMF high group 1 signal (S64: YES), the procedure proceeds to S65, where the DTMF high group 1 signal detection flag provided in the RAM 52 is set. Then, the procedure proceeds to S76. On the other hand, if it is determined that it does not fall within the detection frequency range of DTMF high group 1 signal (S64: NO), the procedure proceeds to S66, where the DTMF high group 1 signal detection flag is cleared. Then, the procedure proceeds to S67.

At S67, it is determined whether or not the. acquired frequency falls within the detection frequency range of DTMF high group 2 signal. If it is determined that it falls within the detected frequency range of DTMF high group 2 signal (S67: YES), the procedure proceeds to S68, where the DTMF high group 2 signal detection flag provided in the RAM 52 is set. Then, the procedure proceeds to S76. On the other hand, if it is determined that it does not fall within the detection frequency range of DTMF high group 2 signal (S67: NO), the procedure proceeds to S69, where the DTMF high group 2 signal detection flag is cleared. Then, the procedure proceeds to S70.

At S70, it is determined whether or not the acquired frequency falls within the detection frequency range of DTMF high group 3 signal. If it is determined that it falls within the detected frequency range of DTMF high group 3 signal (S70: YES), the procedure proceeds to S71, where the DTMF high group 3 signal detection flag provided in the RAM 52 is set. Then, the procedure proceeds to S76. On the other hand, if it is determined that it does not fall within the detection frequency range of DTMF high group 3 signal (S70: NO), the procedure proceeds to S72, where the DTMF high group 3 signal detection flag is cleared. Then, the procedure proceeds to S73.

At S73, it is determined whether or not the acquired frequency falls within the detection frequency range of DTMF high group 4 signal. If it is determined that it falls within the detected frequency range of DTMF high group 4 signal (S73: YES), the procedure proceeds to S74, where the DTMF high group 4 signal detection flag provided in the RAM 52 is set. Then, the procedure proceeds to S76. On the other hand, if it is determined that it does not fall within the detection frequency range of DTMF high group 4 signal (S73: NO), the procedure proceeds to S75, where the DTMF high group 4 signal detection flag is cleared. Then, the procedure proceeds to S76.

And the procedure transfers to S76, where a backlight color determination process is performed.

Figure 13:
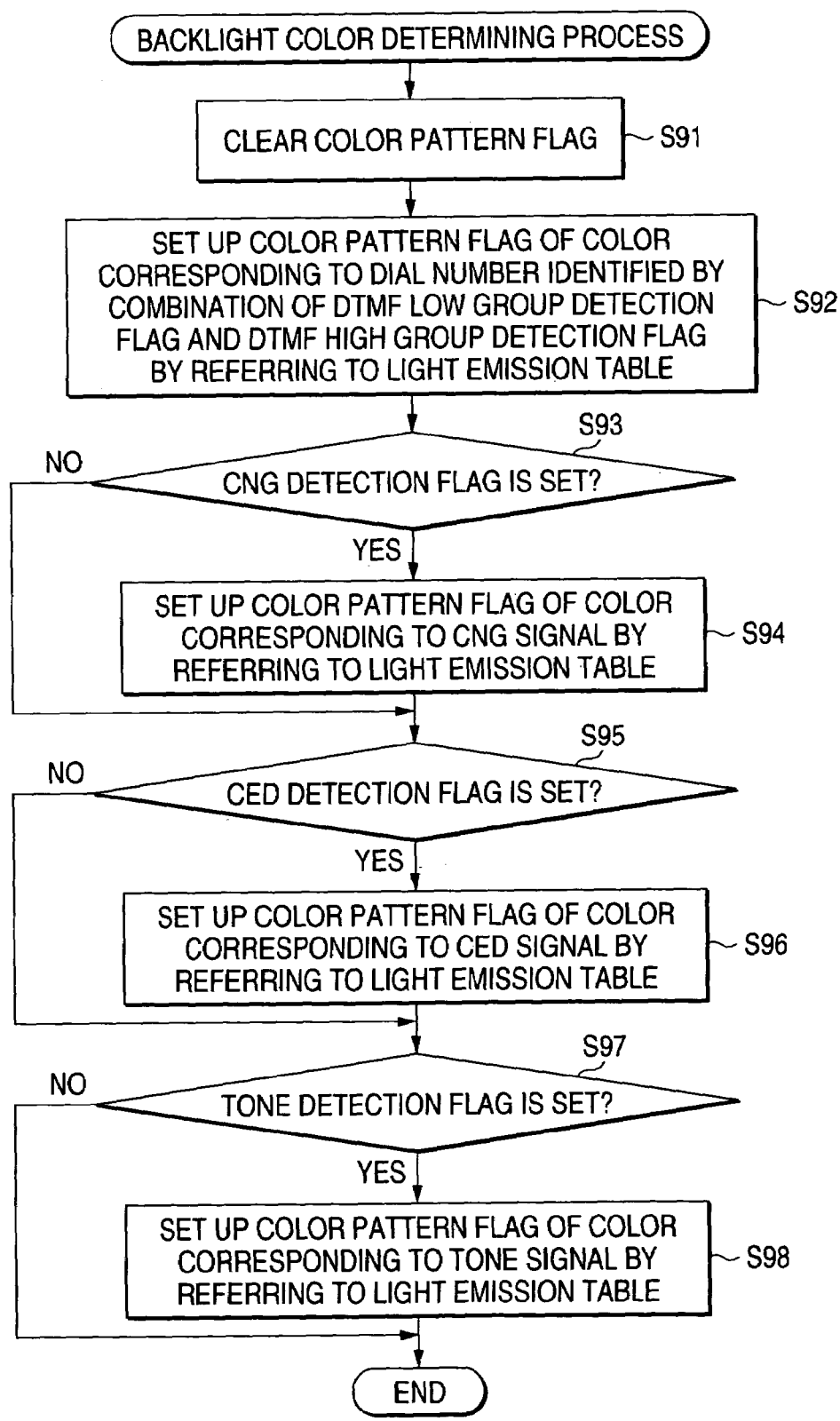
FIG. 13 is a flowchart showing a backlight coloring determination processing procedure according to the embodiment.

The backlight color determination process is executed in accordance with a procedure as shown in FIG. 13. That is, in the backlight color determination process, the CPU 101 first of all clears all the coloring pattern flags provided in the RAM 52 at S91. The coloring pattern flags indicate the color which the backlight portion 56 is lighted with, and include flags for the colors of "red", "blue", "white", "light blue", "dark blue", "yellow", "purple", "light brown", "green", "orange", "olive" and "pink", corresponding to the signal sounds and the backlight colors as shown in FIG. 6A.

And the procedure proceeds to S92, where the dial number is determined by the combination of the DTMF low group signal detection flag and the DTMF high group signal detection flag configured as shown in FIG. 7B, and the coloring pattern flag of the color corresponding to the dial number is set by referring to the emission table 53*a*.

For example, when the DTMF low group 3 signal detection flag and the DTMF high group 2 signal detection flag are set, the dial number is determined as "8", whereby the "orange" coloring pattern flag is set by referring to the emission table 53*a*.

Then, at S93, it is determined whether or not the CNG signal detection flag is set. If it is determined that the CNG signal detection flag is set (S93: YES), the "blue" coloring pattern flag provided in the RAM 52 is set at S94. Then, the procedure transfers to S95. On the other hand, if it is determined that the CNG signal detection flag is not set (S93: NO), the procedure proceeds to S95.

At S95, it is determined whether or not the CED signal detection flag is set. If it is determined that the CED signal detection flag is set (S95: YES), the "white" coloring pattern flag provided in the RAM 52 is set at S96. Then, the procedure proceeds to S97. On the other hand, if it is determined that the CED signal detection flag is not set (S95: NO), the procedure proceeds to S97.

At S97, it is determined whether or not the tone signal detection flag is set. If it is determined that the tone signal detection flag is set (S97: YES), the "red" coloring pattern flag provided in the RAM 52 is set at S98. Then, the backlight color determination process is terminated. On the other hand, if it is determined that the tone signal detection flag is not set (S97: NO), the backlight color determination process is terminated.

Returning to the backlight change process of FIG. 12, after the backlight color determination process at S76 is terminated, it is determined at S77 whether or not all the coloring pattern flags are cleared. If it is determined that all the coloring pattern flags are not cleared (S77: NO), the line current is detected by the line current detecting portion 60 to acquire its current amount at S78.

And the brightness level flag provided in the RAM 52 is set according to the acquired current amount at S79. Herein, the current amount is classified into six levels in which "1" is the lowest level and "6" is the highest level, and the brightness level 1 to 6 flags are provided corresponding to the current amount level. For example, if the acquired current amount level is determined as the level of 3, the brightness level 3 flag is set. Moreover, the brightness is set in a brightness information storage area provided in the RAM 52 by referring to the set brightness level flag and the emission table 53a.

For example, the brightness level 3 corresponds to the "ordinary" line signal volume in the correspondence table between the line signal volume and the backlight brightness as shown in FIG. 6D, whereby a value corresponding to "40%" is set in the brightness information storage area.

Then, the procedure proceeds to S80, whereby one of the set coloring pattern flags is selected, and the backlight portion 56 is lighted for 0.2 seconds at the brightness corresponding to the set value in the brightness information storage area and the color indicating the selected coloring pattern flag. And the procedure proceeds to S81, where the coloring pattern flag corresponding to the color with the coloring pattern flag is cleared.

Thereafter, the procedure proceeds to S82, where it is determined whether or not all the coloring pattern flags are cleared. If it is determined that all the coloring pattern flags are not cleared (S82: NO), the procedure transfers to S78 to repeat the above processing. On the other hand, if it is determined that all the coloring pattern flags are cleared (S82: YES), the backlight change process is terminated.

On the other hand, if it is determined that all the coloring pattern flags are not cleared (S77: YES), the procedure transfers to S83 to turn OFF the backlight portion 56. Then, the backlight change process is terminated Returning to the facsimile transmission start process of FIG. 8, the step S03 is terminated. Then, it is determined whether or not the facsimile transmission indication flag is set at S04. Herein, if it is determined that the facsimile transmission indication flag is set (S04: YES), the procedure proceeds to step S05, where the facsimile automatic transmission process is performed. Furthermore, the facsimile transmission indication flag, the no-response indication flag, and the transmission stop indication flag are cleared at step S09. Then, the facsimile transmission start process is terminated.

On the other hand, if it is determined that the facsimile transmission indication flag is not set at S04 (S04: NO), the procedure proceeds to step S06, where it is determined whether or not the no-response indication flag is set. Herein, if the no-response indication flag is set (S06: YES), the procedure proceeds to step S07, where an error message "Transmission error" is displayed on the LCD 125. Moreover, the step S09 is performed. Then, the facsimile transmission process is terminated.

Also, at step S06, if it is determined that the no-response indication flag is not set, or the transmission stop indication flag is set (S06: NO), the procedure proceeds to step S08, where the standby screen is displayed on the LCD 125. Furthermore, the step S09 is performed. Then, the facsimile transmission process is terminated.

Figure 14:
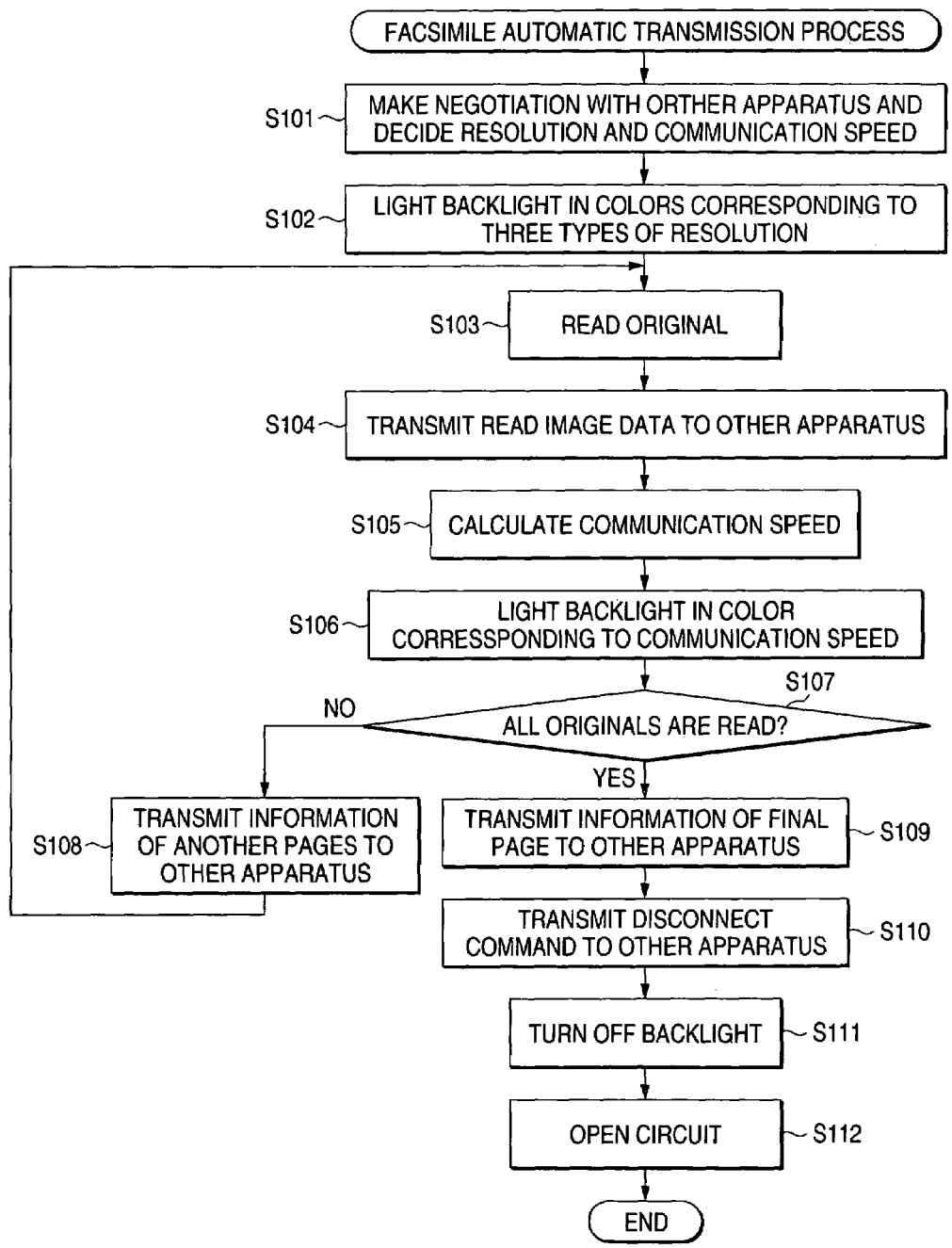
FIG. 14 is a flowchart showing a facsimile automatic transmission processing procedure according to the embodiment.

Referring to FIG. 14, the facsimile automatic transmission process at step S05 in FIG. 8 will be described below. FIG. 14 is a flowchart showing the facsimile automatic transmission process.

If the facsimile automatic transmission process is executed, the CPU 18 first of all makes negotiation with the facsimile machine of transmission destination to decide the optimal communication speed and resolution from the receiving ability for the facsimile machine of transmission destination and the image data for facsimile transmission at step S101. And the information indicating the decided communication speed and resolution are stored in a communication speed storage area and a resolution storage area provided in the RAM 52, respectively.

And the procedure proceeds to step S102, where the coloring pattern flag of the color corresponding to the resolution is set by referring to the information indicating the resolution stored in the resolution storage area and the emission table 53a, and further the backlight portion 56 is lighted with the color corresponding to the coloring pattern flag.

Thereafter, the procedure proceeds to step S103, where the scanner unit 16 scans the original. At step S104, the image data read by the scanner unit 16 is transmitted to the facsimile machine of transmission destination at the communication speed according to the communication speed information stored in the communication speed storage area and the resolution according to the resolution information stored in the resolution storage area.

And at step S105, the communication speed is calculated by detecting the data amount per unit time that the facsimile data for transmission stored in the RAM 52 is transmitted. Moreover, the coloring pattern flag of the color corresponding to the communication speed is set by referring to the calculated communication speed and the emission table 53a, and the backlight portion 56 is lighted with the color corresponding to the coloring pattern flag at step S106.

Then, the procedure proceeds to step S107, where it is determined whether or not all the originals are read. If it is determined that all the originals are not read (S107: NO), the information indicating that another one page exists is transmitted to the facsimile machine of transmission destination at step S108, and then the procedure transfers to step S103 to repeat the above processing. On the other hand, if it is determined that all the originals are read (S107: YES), the information indicating the last page is transmitted to the facsimile machine of transmission destination at step S109. Then, at step S110, a disconnect command is transmitted to the facsimile machine of transmission destination at step S110.

Thereafter, the procedure proceeds to step S111, where the backlight portion 56 is turned OFF. At step S112, the line is opened. Then, the facsimile automatic transmission process is terminated.

Figure 15:
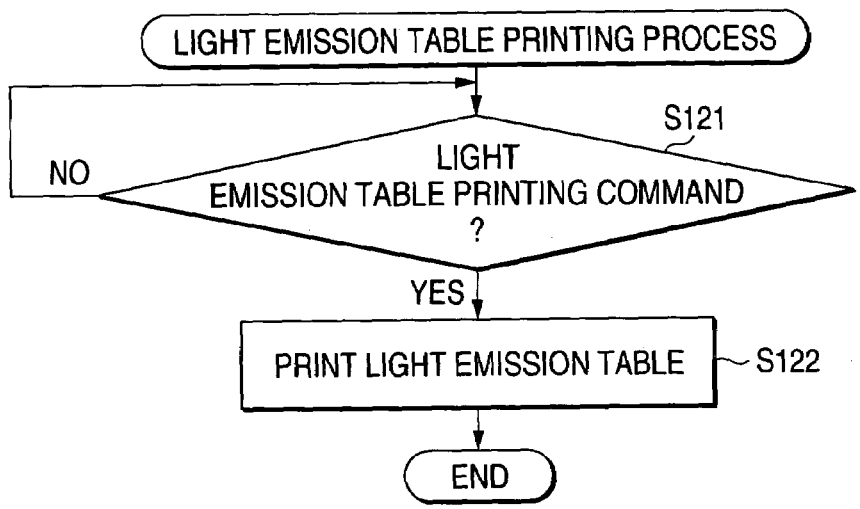
FIG. 15 is a flowchart showing a light emitting table printing processing procedure according to the embodiment.

Referring now to FIG. 15, an emission table printing process executed by the CPU 18 will be described hereinbelow. FIG. 15 is a flowchart showing the emission table printing process. This emission table printing process is performed repeatedly while the facsimile machine 1 is operative (power ON).

If the emission table printing process is executed, the CPU 18 first of all waits for an emission table printing instruction to be issued from the operation panel 12 at step S121. If it is determined that the emission table printing instruction is issued (S121: YES), the procedure proceeds to step S122 to read the emission table 53a stored in the E2PROM 53, and print a list of the emission table 53a on the paper in the recording unit 17. And the emission table printing process is terminated. Herein, the printed list is roughly in the form of FIGS. 6A through 6D.

Figure 16:
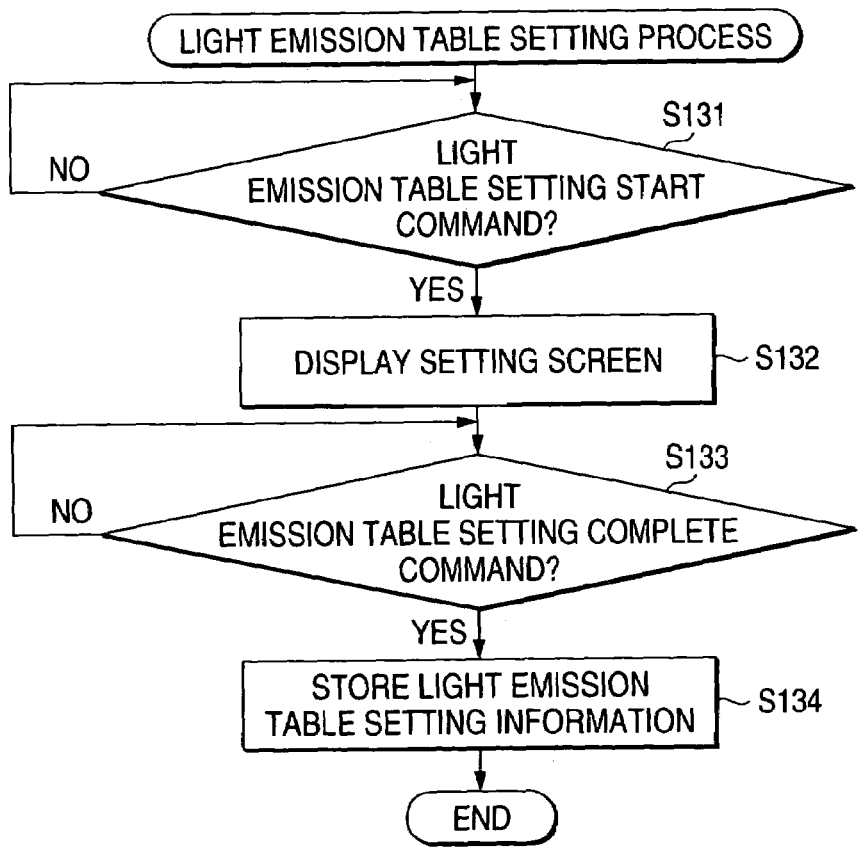
FIG. 16 is a flowchart showing a light emitting table setting processing procedure according to the embodiment.

Referring to now FIG. 16, an emission table setting process executed by the CPU 18 will be described hereinbelow. FIG. 16 is a flowchart showing the emission table setting process. This emission table setting process is performed repeatedly while the facsimile machine 1 is operative (power ON).

If the emission table setting process is executed, the CPU 18 first of all waits for an emission table setting start instruction to be issued from the operation panel 12 at step S131. If it is determined that the emission table setting start instruction is issued (S131: YES), the procedure proceeds to step S132 to display an input screen for the emission table setting information on the LCD 125 provided on the operation panel 12 (S132).

Thereafter, the CPU 18 waits for an emission table setting completion instruction indicating that the input of emission table setting information is completed to be received from the operation panel 12 at step S133.

And if the emission table setting completion instruction is received, it is determined that the input of emission table setting information is completed (S133: YES). At step S134, the data indicating the emission table setting information input from the operation panel 12 by an external operation of the user is stored in the emission table 53a of the E2PROM 53. Then, the emission table setting process is terminated.

Figure 17:
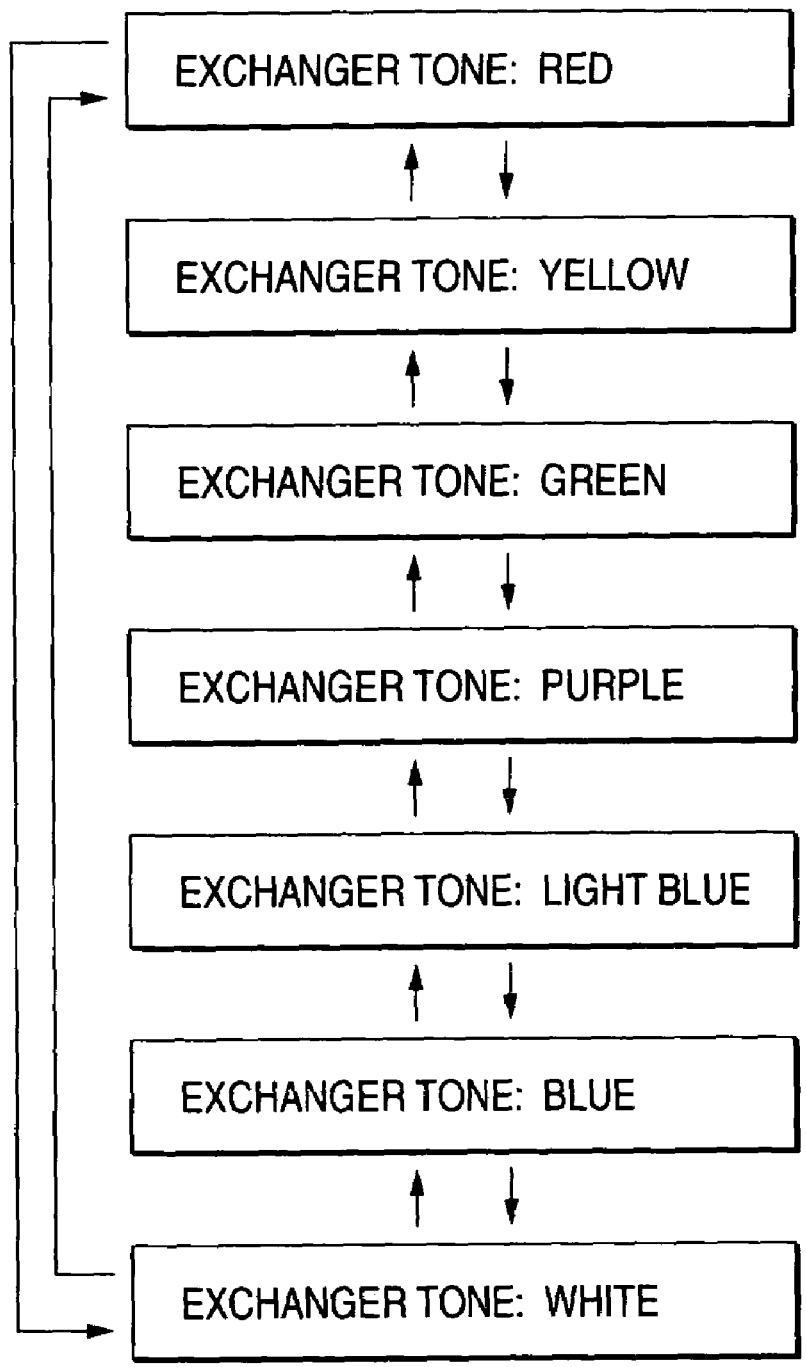
FIG. 17 is a diagram showing a light emitting table setting procedure according to the embodiment.

A specific operation method for changing the settings of the emission table 53a involves, for example, operating a selection key 123 when the backlight color corresponding to the tone signal is changed, whereby a screen representing the tone signal and the color corresponding to the tone signal is selected on the LCD 125 (see FIG. 17). Thereafter, the selection screen for the tone signal is scrolled up or down. For example, by scrolling up, the selection screen is changed from "red" to "yellow" to "green" in succession, whereby by depressing the selection key 123 when desired color is displayed, the backlight color corresponding to the tone signal is set to the desired color, as shown in FIG. 17. The backlight color may be changed by the CNG signal, CED signal, DTMF signal, resolution and communication speed in the same way.

In the embodiment as described above, the backlight portion 56 functions as light emitting device of the invention, and the NCU 55 functions as communicating unit and facsimile communicating unit of the invention.

The process of steps from S41 to S51 functions as detector of the invention, the process of step S78 in FIG. 12 functions as detector of the invention, the process of the steps S41, S42 and S52 to S75 in FIGS. 11 and 12 functions as detector of the invention, and the process of the steps S101 and S104 in FIG. 14 functions as detector of the invention.

The process of from steps S93 to S98 in FIG. 13, step S80 in FIG. 12 and the emission table setting process in FIG. 16 function as controller of the invention, the process of the steps S79 and S80 in FIG. 12 function as controller of the invention, the process of the step S92 in FIG. 13 and the step S80 in FIG. 12 function as controller of the invention, and the process of the steps S102 and S106 in FIG. 14 function as controller of the invention.

The emission table setting process shown in FIG. 15 functions as printing unit of the invention.

In the facsimile machine 1 as configured as described above, a signal sound input into the NCU 55 from the time of issuing a call to the other facsimile machine 2 till the time of receiving a response to the call from the facsimile machine 2 is detected at steps from S41 to S51 in FIG. 11, and the backlight portion 56 emits light in a color set in the light emission table 53a corresponding to the type of signal sound at steps from S93 to S98 in FIG. 13 and step S80 in FIG. 12.

Therefore, the user of the facsimile machine 1 can grasp the communication status from the time of issuing a call to the other facsimile machine 2 till the time of receiving a response to the call from the other facsimile machine 2 in accordance with a difference in color of the light emitted from the backlight portion 56, without staying with the side of the facsimile machine 1, as far as the user can view the facsimile machine 1 at the present user's position. Moreover, since means for detecting the signal sound input into the NCU 55 is installed later, a function for enabling the backlight portion 56 to emit light in accordance with the communication status is relatively easily implemented even when installed later.

Since the backlight change process as shown in FIGS. 11 and 12 is repeated during the facsimile transmission, the user of the facsimile machine 1 can grasp the communication status in real time.

Since at steps S79 and S80 in FIG. 12, the backlight portion 56 emits light at a brightness set in the light emission table 53a corresponding to the level of signal sound detected at step S78 in FIG. 12, the user of the facsimile machine 1 can grasp whether or not the communication is performed at a favorable level of signal sound based on a difference in the brightness.

Since at steps S92 in FIG. 13 and step S80 in FIG. 12, the backlight portion 56 emits light in a color set in the light emission table 53a corresponding to the type of DTMF signal sound detected at steps S41 to S42 and S52 to S75 in FIGS. 11 and 12, the user of the facsimile machine 1 can grasp that the telephone number information is sent out to the public switched telephone network 100 even in the noisy surroundings.

Since at steps S41 to S51 in FIG. 11 and steps S41 to S42 and S52 to S75 in FIGS. 11 and 12, the type of signal sound is determined by detecting the frequency of signal sound input into the NCU 55, the exchanger tone signal, CNG signal, CED signal and DTMF signal can be determined.

Since at step S102 in FIG. 14, the backlight portion 56 emits light in a color set in the light emission table 53a corresponding to the resolution detected at step S101 in FIG. 14, the user of the facsimile machine 1 can grasp the resolution when communicating the image data in accordance with a difference in color of the light emitted from the backlight portion 56, without staying with the side of the facsimile machine 1.

Since at step S106 in FIG. 14, the backlight portion 56 emits light in a color set in the light emission table 53a corresponding to the communication speed detected at step S105 in FIG. 14, the user of the facsimile machine 1 can grasp the communication speed when communicating the image data in accordance with a difference in color of the light emitted from the backlight portion 56.

Since the contents of the light emission table 53a are printed on the paper through the light emission table setting process in FIG. 15, the user of the facsimile machine 1 can grasp the communication status from the light emitting state by referring to the contents of the light emitting state corresponding to the communication status that are printed on the paper.

Since the set entries in the light emission table 53a are changed through the light emission table setting process, the set entries of the light emission table 53a are changed for the user to easily grasp or according to the user's preference.

While a preferred embodiment of the invention has been described above, the invention is not limited to the above embodiment, but various modifications or variations may be made thereto within the technical scope of the invention.

For a holding tone during the telephone talking, the holding tone from the other end of the telephone may be configured to be recognized and learned, its result associated with the other end of the telephone being stored, and its storage content and the holding tone from the other end of the telephone are compared to display the information as to the other end of the telephone.

In the above embodiment, the image is formed by laser printing. However, the image forming apparatus may form the image by an ink jet printing or a thermal transfer printing, or form the image in color instead of monochrome.

In the above embodiment, the backlight color is changed according to the type of signal sound, or the backlight brightness is changed according to the amount of line current. However, the backlight brightness may be changed according to the type of signal sound, as shown in FIG. 18A, or the backlight color may be changed according to the amount of line current, as shown in FIG. 18B.

In the above embodiment, the processes as shown in FIGS. 8 through 16 are performed by the CPU 18 equipped in the facsimile machine 1. However, these processes may be performed in another computer system connected via the wired or wireless signal transmission path to the facsimile machine 1.

The ECM communication, the non-ECM communication, the coding system (MH, MR, MMR, JBIG, and the like), and the line speed (1/ms) may be determined and displayed. Moreover, a success or failure of communication, a status of decoding error, and a status of retransmission in ECM communication may be displayed.

As described above, according to one aspect of the invention, there is provided a communication apparatus including: a communication unit that communicates with other communication apparatus via a communication network; a detector that detects a communication status of the communication unit during a period of time at least from a time when a call is issued to the other communication apparatus by the communication apparatus until a time when a response from the other communication apparatus to the call is received by the communication apparatus; a light emitting device configured to emit light in a plurality of light emitting states that are visually discernible; and a controller that controls the light emitting state of the light emitting device in accordance with the communication status detected by the detector.

In the communication apparatus as configured as above, the communication status of communication unit is monitored from the time of issuing a call to the other communication apparatus until the time of receiving a response to the call, and the light emitting device emits light in a plurality of light emitting states that are visually discernible in accordance with the communication status.

Therefore, the user of the communication apparatus can grasp the communication status from the time of issuing a call to the other communication apparatus until the time of receiving a response to the call, without staying with the side of the communication apparatus, as far as the user can view the communication apparatus at the present user's position.

In the communication apparatus, the detector may detect the communication status of communication unit at every predetermined interval (e.g., three seconds) and the light emitting device may emit light in accordance with the communication status. However the detector may be configured to monitor the communication status on a continuous basis, and the controller may change the light emitting state of the light emitting device in real time in accordance with the communication status.

In the communication apparatus, the communication status is monitored on a continuous basis, and the light emitting state of the light emitting device is changed in real time in accordance with the communication status, whereby the present communication status is grasped without delay.

In the communication apparatus, data regarding the communication status such as "issuing a call to the other communication apparatus" or "receiving a response from the other communication apparatus" may be acquired from the communication unit to change the light emitting state of the light emitting device in accordance with the acquired data. However, to install this feature afterwards, it is required to change a program for controlling the communication unit to acquire the data.

Therefore, the detector may detect a signal sound input into the communication unit to determine the type of the signal sound, and the controller may control the light emitting device to emit light in a light emitting state corresponding to the type of signal sound detected by the detector.

In the communication apparatus configured as above, a signal sound input into the communication unit is detected, and the light emitting device emits light in a light emitting state corresponding to the type of detected signal sound, whereby the feature to detect the signal sound input into the communication apparatus needs to be installed later. That is, a feature for enabling the light emitting device to emit light in accordance with the communication status is relatively easy to be installed later.

In the communication apparatus, detector for detecting a signal sound input into the communication unit to determine the level of the signal sound, and controller for controlling the light emitting device to emit light in a light emitting state corresponding to the level of signal sound detected by the detector may be provided.

In the communication apparatus configured as above, the light emitting device emits light in a light emitting state corresponding to the level of signal sound input into the communication unit, whereby the user of the communication apparatus can grasp whether or not the communication is performed at a favorable level of signal sound.

In the communication apparatus that communicates using the tone dialing, the telephone number information is sent out to the public switched telephone network by combining a low group of DTMF signal sound and a high group of DTMF signal sound. At this time, the signal sound is output from the transmitter-receiver, whereby the user of the communication apparatus can grasp that the telephone number information is sent out. However, the user often cannot catch the signal sound in the noisy surroundings.

Thus, the communication apparatus may further include detector for detecting at least one of a low group and a high group of DTMF signal sounds input into the communication unit to determine the type of the DTMF signal sound, and controller for controlling the light emitting device to emit light in a light emitting state corresponding to the type of the DTMF signal sound detected by the detector.

In the communication apparatus configured as above, the light emitting device emits light in a light emitting state corresponding to the type of DTMF signal sound input into the communication unit, whereby the user can grasp that the telephone number information is sent out to the public switched telephone network even in the noisy surroundings.

Also, among the signal sounds useful for making communication via the public switched telephone network, an exchanger tone signal, a facsimile CNG signal and a facsimile CED signal can be distinguished with the frequency. In the communication apparatus, the detector may detect the frequency of signal sound input into the communication unit to determine the type of the signal sound.

In the communication apparatus configured as above, the type of signal sound is determined by detecting the frequency of signal sound input into the communication unit, whereby the exchanger tone signal, facsimile CNG signal and facsimile CED signal can be determined.

Moreover, the type of DTMF signal sound is distinguished with the frequency. Therefore, in the communication apparatus, the detector may detect the frequency of the DTMF signal sound input into the communication unit to determine the type of the DTMF signal sound.

In the communication apparatus configured as above, the type of DTMF signal sound is determined to detect the frequency of DTMF signal sound input into the communication unit.

Also, to report the communication status using the light emitting device as in the invention, the light emitting device may be flashed to change the flashing pattern (lighting interval, light-up time, light-out time, etc.) in accordance with the communication status. However, the user is difficult to grasp the communication status only by flashing the light emitting device, and the number of types of communication status grasped by the user is small.

Therefore, in the communication apparatus, the light emitting device may be configured to take a plurality of color states that are visually discernible, in which the controller controls the light emitting device to emit light in a color state corresponding to the type of signal sound detected by the detector. The light emitting device may be configured to take a plurality of brightness states that are visually discernible, in which the controller controls the light emitting device to emit light in a brightness state corresponding to the type of signal sound detected by the detector.

That is, when the light emitting device emits light, the color or brightness of light emitted by the light emitting device is changed corresponding to the type of signal sound, whereby the user can easily grasp the type of signal sound (or communication status of communication unit) from the light emitting state of the light emitting device. Furthermore, since the user can easily discern a change in the color or brightness of light emitted by the light emitting device, the types of signal sound (or communication status of communication unit) that the user can discern by light emitted from the light emitting device can be increased.

The above described techniques may be applied separately, but if the color or brightness of light emitted from the light emitting device is changed corresponding to the type of signal sound by combination of these techniques, the user can more easily grasp the type of signal sound (or communication status of communication unit) from the light emitting state.

Likewise, in the communication apparatus, the light emitting device may be configured to take a plurality of color states that are visually discernible, in which the controller controls the light emitting device to emit light in a color state corresponding to the level of signal sound detected by the detector. The light emitting device may be configured to take a plurality of brightness states that are visually discernible, in which the controller controls the light emitting device to emit light in a brightness state corresponding to the level of signal sound detected by the detector.

Accordingly, the user can easily grasp the level of signal sound (or communication status of communication unit) from the light emitting state of the light emitting device, and the number of levels of signal sound (or communication statuses of communication unit) that the use can discern by the light emitted from the light emitting device is increased.

The communication apparatus may further include printing unit for printing the contents describing the communication status and the light emitting state corresponding to the communication status on the paper.

In the communication apparatus configured as above, the contents describing the communication status and the light emitting state corresponding to the communication status are printed on the paper, the user of the communication apparatus can grasp the communication status from the light emitting state by referring to the contents of the light emitting state corresponding to the communication status printed on the paper.

The communication apparatus may further include setting input unit for inputting the setting information for setting a light emitting state corresponding to the communication status by an operation of the operator, in which the controller changes the light emitting state corresponding to the communication status in accordance with the setting information, if the setting information is input from the setting input unit.

In the communication apparatus configured as above, if the setting information for setting a light emitting state corresponding to the communication status is input from the setting input unit by an operation of the operator, the light emitting state corresponding to the communication status is changed in accordance with the setting information, whereby the correspondence between the communication status and the light emitting state is changed so that the user can easily grasp the communication status or according to the user's preference.

In the communication apparatus, the detector may detect the resolution of an image represented by the facsimile data when communicating the facsimile data, in which the controller controls the light emitting device to emit light in a light emitting state corresponding to the resolution detected by the detector.

In the communication apparatus configured as above, the light emitting device emits light in a light emitting state corresponding to the resolution detected by the detector, whereby the user of the facsimile machine can grasp the resolution when communicating an image data.

In the communication apparatus, the detector may detect the communication speed, and the controller may control the light emitting device to emit light in a light emitting state corresponding to the communication speed detected by the detector.

In the communication apparatus configured as above, the light emitting device emits light in a light emitting state corresponding to the communication speed detected by the detector, whereby the user of the facsimile machine can grasp the communication speed.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A communication apparatus comprising:
    a communication unit that communicates image data with other communication apparatus via a communication network;
    a detector that detects a communication status of the communication unit during a period of time at least from a time when a call is issued to the other communication apparatus by the communication apparatus until a time when a response to the call from the other communication apparatus is received by the communication apparatus and determines a resolution of the image data;

a light emitting device configured to emit light in a plurality of light emitting states that are visually discernible; and a controller that controls the light emitting state of the light emitting device in accordance with the communication status detected by the detector and the resolution of the image data determined by the detector.

2. The communication apparatus according to claim 1 further comprises an operation input unit to which a user inputs an operation, wherein the communication unit issues a call in accordance with the operation input to the operation unit.

3. The communication apparatus according to claim 1, wherein the detector continuously detects the communication status, and wherein the controller continuously controls the light emitting state of the light emitting device in accordance with the communication status detected by the detector.

4. The communication apparatus according to claim 1, wherein the detector detects a signal input to the communication unit and determines a type of the signal, and wherein the controller controls the light emitting state of the light emitting device in accordance with the type of the signal determined by the detector.

5. The communication apparatus according to claim 4, wherein the detector determines the type of the signal by detecting a frequency of the signal.

6. The communication apparatus according to claim 4, wherein the light emitting device is configured to take a plurality of color states that are visually discernible, and wherein the controller controls the color state of the light emitting device in accordance with the type of signal determined by the detector.

7. The communication apparatus according to claim 4, wherein the light emitting device is configured to take a plurality of brightness states that are visually discernible, and wherein the controller controls the brightness state of the light emitting device in accordance with the type of signal determined by the detector.

8. The communication apparatus according to claim 1, wherein the detector detects a signal input to the communication unit and determines a signal level of the signal, and wherein the controller controls the light emitting state of the light emitting device in accordance with the signal level of the signal determined by the detector.

9. The communication apparatus according to claim 8, wherein the light emitting device is configured to take a plurality of color states that are visually discernible, and wherein the controller controls the color state of the light emitting device in accordance with the signal level of the signal determined by the detector.

10. The communication apparatus according to claim 8, wherein the light emitting device is configured to take a plurality of brightness states that are visually discernible, and wherein the controller controls the brightness state of the light emitting device in accordance with the signal level of the signal determined by the detector.

11. The communication apparatus according to claim 1, wherein the detector detects at least one of a low group and a high group of a DTMF signal input to the communication unit and determines a type of the DTMF signal, and wherein the controller controls the light emitting state of the light emitting device in accordance with the type of the DTMF signal determined by the detector.

12. The communication apparatus according to claim 11, wherein the detector determines the type of the DTMF signal by detecting a frequency of the DTMF signal input to the communication unit.

13. The communication apparatus according to claim 11, wherein the light emitting device is configured to take a plurality of color states that are visually discernible, and wherein the controller controls the color state of the light emitting device in accordance with the type of the DTMF signal determined by the detector.

14. The communication apparatus according to claim 11, wherein the light emitting device is configured to take a plurality of brightness sates that are visually discernible, and wherein the controller controls the brightness state of the light emitting device in accordance with the type of the DTMF signal determined by the detector.

15. The communication apparatus according to claim 1, wherein the light emitting device is configured to take a plurality of color states that are visually discernible, and wherein the controller controls the color state of the light emitting device in accordance with the communication status detected by the detector.

16. The communication apparatus according to claim 1, wherein the light emitting device is configured to take a plurality of brightness states that are visually discernible, and wherein the controller controls the brightness state of the light emitting device in accordance with the communication status detected by the detector.

17. The communication apparatus according to claim 1 further comprising a printing unit that prints out content describing the communication status and the light emitting state corresponding to the communication status.

18. The communication apparatus according to claim 1 further comprising a setting input unit to which a user inputs setting information for setting a light emitting state corresponding to the communication status, wherein the controller changes the light emitting state corresponding to the communication status in accordance with the setting information when the setting information is input to the setting input unit.

19. The communication apparatus according to claim 1, wherein the detector determines a communication speed of the communication by the communication unit, and wherein the controller controls the light emitting state of the light emitting device in accordance with the communication speed determined by the detector.

20. The communication apparatus according to claim 19, wherein the light emitting device is configured to take a plurality of color states that are visually discernible, and wherein the controller controls the color state of the light emitting device in accordance with the communication speed determined by the detector.

21. The communication apparatus according to claim 19, wherein the light emitting device is configured to take a plurality of brightness states that are visually discernible, and wherein the controller controls the brightness state of the light emitting device in accordance with the communication speed determined by the detector.

22. The communication apparatus according to claim 1, wherein the communication unit communicates facsimile data as the image data.

23. The communication apparatus according to claim 22, wherein the light emitting device is configured to take a plurality of color states that are visually discernible, and wherein the controller controls the color state of the light emitting device in accordance with the resolution of the image data determined by the detector.

24. The communication apparatus according to claim 22, wherein the light emitting device is configured to take a plurality of brightness states that are visually discernible, and
wherein the controller controls the brightness state of the light emitting device in accordance with the resolution of the image data determined by the detector.

25. A facsimile machine comprising:
a communication unit that communicates a facsimile data as image data with other facsimile machine via a public switched telephone network;
a detector that detects a signal sound input to the communication unit and determines a type of the signal sound during a period of time at least from a time when a call is issued to the other facsimile machine by the facsimile machine until a time when a response to the call from the other facsimile machine is received by the facsimile machine and a resolution of the image data;
a light emitting device configured to emit light in a plurality of light emitting states that are visually discernible; and
a controller that controls the light emitting state of the light emitting device in accordance with the type of the signal sound determined by the detector and the resolution of the image data determined by the detector.

26. The facsimile machine according to claim 25, wherein the detector determines a communication speed of the communication by the communication unit, and
wherein the controller controls the light emitting state of the light emitting device in accordance with the communication speed determined by the detector.

27. A facsimile machine comprising:
a communication unit that communicates a facsimile data with other facsimile machine via a public switched telephone network;
a detector that detects a signal input to the communication unit and determines a frequency level of the signal during a period of time at least from a time when a call is issued to the other facsimile machine by the facsimile machine until a time when a response to the call from the other facsimile machine is received by the facsimile machine;
a light emitting device configured to emit light in a plurality of light emitting states that are visually discernible; and
a controller that controls the light emitting state of the light emitting device in accordance with the frequency level of the signal determined by the detector.

28. The facsimile machine according to claim 27, wherein the light emitting device is configured to take a plurality of color states that are visually discernible, and
wherein the controller controls the color state of the light emitting device in accordance with the frequency level of the signal determined by the detector.

29. The facsimile machine according to claim 27, wherein the light emitting device is configured to take a plurality of brightness states that are visually discernible, and
wherein the controller controls the brightness state of the light emitting device in accordance with the frequency level of the signal determined by the detector.

* * * * *